United States Patent
Khatibzadeh et al.

(10) Patent No.: US 11,671,175 B2
(45) Date of Patent: *Jun. 6, 2023

(54) METHODS, DEVICES, AND SYSTEMS FOR INTEGRATION, BEAM FORMING AND STEERING OF ULTRA-WIDEBAND, WIRELESS OPTICAL COMMUNICATION DEVICES AND SYSTEMS

(71) Applicant: Lumeova, Inc., Raleigh, NC (US)

(72) Inventors: Mohammad Ali Khatibzadeh, Cary, NC (US); Arunesh Goswami, Raleigh, NC (US); Morteza Abbasi, Raleigh, NC (US)

(73) Assignee: LUMEOVA, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,794

(22) Filed: Feb. 14, 2022

(65) Prior Publication Data

US 2022/0166505 A1    May 26, 2022

Related U.S. Application Data

(63) Continuation of application No. 16/916,414, filed on Jun. 30, 2020, now Pat. No. 11,251,865, which is a
(Continued)

(51) Int. Cl.
*H04B 10/00*   (2013.01)
*H04B 10/112*   (2013.01)
(Continued)

(52) U.S. Cl.
CPC ....... *H04B 10/112* (2013.01); *H04B 10/1123* (2013.01); *H04B 10/29* (2013.01);
(Continued)

(58) Field of Classification Search
CPC . H04B 10/112; H04B 10/1123; H04B 10/114; H04B 10/1143; H04B 10/1149;
(Continued)

(56) References Cited

U.S. PATENT DOCUMENTS 4,025,157 A    5/1977   Martin
4,049,994 A  *  9/1977   Ladany ............... H01L 33/0025
                                                                313/499

(Continued)

FOREIGN PATENT DOCUMENTS

| GB | 2499789 A | 9/2013 |
|---|---|---|
| JP | 10144964 A | 5/1998 |
| WO | 2017139317 A1 | 8/2017 |

OTHER PUBLICATIONS

USPTO; Non-Final Office Action for U.S. Appl. No. 16/916,510 dated Jan. 13, 2021, 36 pages.
(Continued)

*Primary Examiner* — Hanh Phan
(74) *Attorney, Agent, or Firm* — NK Patent Law

(57) ABSTRACT

Disclosed herein are methods, devices, and system for beam forming and beam steering within ultra-wideband, wireless optical communication devices and systems. According to one embodiment, a free space optical (FSO) communication apparatus is disclosed. The FSO communication apparatus includes an array of optical sources wherein each optical source of the array of optical sources is individually controllable and each optical source configured to have a transient response time of less than 500 picoseconds (ps).

20 Claims, 28 Drawing Sheets

Related U.S. Application Data continuation of application No. PCT/US2019/018411, filed on Feb. 18, 2019.

(60) Provisional application No. 62/634,958, filed on Feb. 26, 2018.

(51) Int. Cl.

| | | |
|---|---|---|
| *H04B 10/29* | (2013.01) | |
| *H04B 10/50* | (2013.01) | |
| *H04B 10/61* | (2013.01) | |
| *H04B 10/291* | (2013.01) | |
| *H04B 10/67* | (2013.01) | |
| *H04B 10/69* | (2013.01) | |
| *G02B 5/20* | (2006.01) | |
| *G02B 5/30* | (2006.01) | |

(52) U.S. Cl.
CPC ....... *H04B 10/2914* (2013.01); *H04B 10/501* (2013.01); *H04B 10/502* (2013.01); *H04B 10/61* (2013.01); *H04B 10/67* (2013.01); *H04B 10/695* (2013.01); *G02B 5/20* (2013.01); *G02B 5/3025* (2013.01); *H04B 2210/003* (2013.01)

(58) Field of Classification Search
CPC ...... H04B 10/116; H04B 10/40; H04B 10/29; H04B 10/2914; H04B 10/501; H04B 10/502; H04B 10/61; H04B 10/67; H04B 10/695; H04B 10/27; H04B 10/118; H04B 10/1127; H04B 10/1129
USPC ....... 398/118, 119, 120, 121, 122, 123, 124, 398/125, 127, 128, 129, 130, 131, 135, 398/136, 172, 158, 159, 33, 38, 66, 67, 398/68, 69, 70, 71, 72
See application file for complete search history.

(56) References Cited

U.S. PATENT DOCUMENTS

| | | | |
|---|---|---|---|
| 4,727,600 A | 2/1988 | Avakian | |
| 5,252,513 A | 10/1993 | Paoli et al. | |
| 5,621,225 A | 4/1997 | Shieh et al. | |
| 5,801,892 A | 9/1998 | Naganuma et al. | |
| 5,883,912 A | 3/1999 | Ramdani et al. | |
| 6,348,986 B1 | 2/2002 | Doucet et al. | |
| 6,721,510 B2 | 4/2004 | Graves et al. | |
| 7,277,644 B2* | 10/2007 | Johnson | H04L 1/0045 398/118 |
| 7,860,398 B2 | 12/2010 | Tatum et al. | |
| 8,233,806 B2 | 7/2012 | Kitaji | |
| 10,009,107 B2 | 6/2018 | Segura et al. | |
| 10,263,146 B2* | 4/2019 | Khatibzadeh | H01L 31/167 |
| 10,453,994 B2* | 10/2019 | Khatibzadeh | H01L 33/04 |
| 11,233,172 B2* | 1/2022 | Khatibzadeh | H01L 33/14 |
| 11,251,865 B2* | 2/2022 | Khatibzadeh | H04B 10/61 |
| 2001/0023057 A1 | 9/2001 | Alexander | |
| 2002/0053062 A1 | 5/2002 | Szymanski | |
| 2003/0081914 A1 | 5/2003 | Steinberg et al. | |
| 2005/0254758 A1 | 11/2005 | Kropp | |
| 2006/0056855 A1 | 3/2006 | Nakagawa et al. | |
| 2006/0115274 A1 | 6/2006 | Pammer et al. | |
| 2007/0120135 A1 | 5/2007 | Soules et al. | |
| 2007/0236956 A1 | 10/2007 | Kolodin et al. | |
| 2008/0179602 A1 | 7/2008 | Negley et al. | |
| 2010/0135668 A1 | 6/2010 | Amadeo et al. | |
| 2013/0182620 A1 | 7/2013 | Chaffee et al. | |
| 2013/0202311 A1* | 8/2013 | Xia | H04B 10/11 398/130 |
| 2014/0293646 A1 | 10/2014 | Iwazaki et al. | |
| 2015/0188630 A1* | 7/2015 | Yeh | H04B 10/116 398/118 |
| 2015/0195042 A1 | 7/2015 | Raskar | |
| 2015/0288942 A1 | 10/2015 | Jannard et al. | |
| 2015/0312990 A1 | 10/2015 | Van De Ven et al. | |
| 2015/0349881 A1* | 12/2015 | Byers | H04B 10/07955 398/118 |
| 2016/0149645 A1 | 5/2016 | Liu et al. | |
| 2016/0226584 A1 | 8/2016 | Chalfant, III | |
| 2017/0051885 A1 | 2/2017 | Hirasawa et al. | |
| 2018/0046236 A1 | 2/2018 | Erturk et al. | |
| 2018/0317184 A1 | 11/2018 | Bushnell | |
| 2019/0028192 A1 | 1/2019 | Tsonev et al. | |

OTHER PUBLICATIONS

ISA/RU; International Search Report and Written Opinion for International Application No. PCT/US2019/018411 dated Jun. 13, 2019, 7 pages.

EPO, Extended European Search Report for corresponding European Patent Application No. 19757097.1, dated Nov. 4, 2021, 9 pages.

WIPO; International Preliminary Report on Patentability for International Patent Application No. PCT/US2019/018411 dated Aug. 27, 2020, 5 pages.

ISA/RU; International Search Report and Written Opinion for International Patent Application No. PCT/US2020/067619 dated Mar. 25, 2021, 7 pages.

USPTO; Final Office Action for U.S. Appl. No. 16/916,510 dated Jun. 8, 2021, 21 pages.

USPTO; Non-Final Office Action for U.S. Appl. No. 16/916,414 dated Mar. 30, 2021, 15 pages.

USPTO; Non-Final Office Action for U.S. Appl. No. 17/526,331 dated Aug. 17, 2022, 31 pages.

* cited by examiner

BLOCK DIAGRAM
800

METHODS, DEVICES, AND SYSTEMS FOR INTEGRATION, BEAM FORMING AND STEERING OF ULTRA-WIDEBAND, WIRELESS OPTICAL COMMUNICATION DEVICES AND SYSTEMS

PRIORITY CLAIM

This application is a continuation of U.S. Non-Provisional patent application Ser. No. 16/916,414 entitled "METHODS, DEVICES, AND SYSTEMS FOR INTEGRATION, BEAM FORMING AND STEERING OF ULTRA-WIDEBAND, WIRELESS OPTICAL COMMUNICATION DEVICES AND SYSTEMS,", which was filed on Jun. 30, 2020, which is a continuation of PCT Patent Application No. PCT/US2019/018411 entitled "A FREE SPACE OPTICAL COMMUNICATION APPARATUS," which was filed on Feb. 18, 2019, which claims benefit of and priority to U.S. Provisional Patent Application No. 62/634,958 entitled "METHODS, DEVICES, AND SYSTEMS FOR INTEGRATION, BEAM FORMING AND STEERING OF ULTRA-WIDEBAND, WIRELESS OPTICAL COMMUNICATION DEVICES AND SYSTEMS," which was filed on Feb. 26, 2018, the entire contents of which are all hereby incorporated herein by reference.

TECHNICAL FIELD

Disclosed herein are methods, devices, and systems for integration, beam forming and beam steering of ultra-wideband, wireless optical communication devices and systems.

BACKGROUND

Beam forming and beam steering are useful radio frequency (RF) techniques that have been implemented for all types of communication including fixed and mobile transmission links for military, telecom, and consumer applications. Examples include multiple-input and multiple-output (MIMO) and phased array antenna configurations. Beam forming and beam steering allow for reduced power consumption, higher data through-puts, and increased transmission distances within a given RF spectrum for wireless communications systems.

However, newly introduced free space optical (FSO) systems promise many advantages over their RF counterparts. For example, FSO systems do not penetrate walls and doors and require line of sight (LOS) from transmitter to receiver. This restriction provides increased security and less interference with adjacent systems. FSO systems generally do not create electromagnetic interference (EMI) and are somewhat immune to EMI from other sources. Additionally, newly disclosed FSO systems are allowing throughput data transmission capabilities much greater that even millimeter wave systems in the 30 Gigahertz (GHz) to 300 GHz. Some such devices and systems are disclosed in PCT application WO 2017/139317 titled ULTRA-WIDEBAND, WIRELESS OPTICAL HIGH SPEED COMMUNICATION DEVICES AND SYSTEMS, the contents of which are incorporated by reference herein. As such, beam forming and beam steering for FSO communications systems are needed and may offer many of the same advantages as with RF communication systems.

SUMMARY

Disclosed herein are methods, devices, and systems for beam forming and beam steering within ultra-wideband, wireless optical communication devices and systems. According to one embodiment, a free space optical (FSO) communication apparatus providing electrically controlled beam steering is disclosed. The FSO communication apparatus includes an array of optical sources wherein each optical source of the array of optical sources is individually controllable and positioned to provide a finite beam enabling the array of optical source to provide a steerable far field radiation pattern.

In some embodiments, each optical source within the array of optical sources may be configured to operate at least partially within one or more of an infra-red spectrum, a deep infra-red spectrum, an ultra-violet spectrum, a deep ultra-violet spectrum, and/or a visible light spectrum. Each optical source may be a light emitting diode (LED) and each LED may be configured to have a transient response time of less than 500 picoseconds (ps). In certain embodiments, each optical source of the array of optical sources may be a surface emitting LED. In other embodiments, each optical source may be an edge emitting LED.

In some embodiments, the steerable far field radiation pattern is an approximate conical coverage pattern of at least 1 degree. In other embodiments, the steerable far field radiation pattern is an approximate conical coverage pattern of at least 5 degrees.

In some embodiments, the array of optical sources may be configured to transmit over a conical coverage pattern of at least 60 degrees. In other embodiments, the array of optical sources may be configured to transmit over a conical coverage pattern of at least 90 degrees. In other embodiments, the array of optical sources may be configured to transmit over a conical coverage pattern of at least 120 degrees.

The FSO communication apparatus may be implemented within a stationary communication device. For example, the stationary communication device may be a wireless access point. In other embodiments, the FSO communication apparatus may be implemented within a mobile system. The mobile system may be implemented within an aircraft system. The aircraft system may be implemented within manned aircraft or an unmanned aerial vehicle (UAV). In other embodiments, the mobile system may be implemented within an autonomous underwater vehicle (AUV). In certain embodiments, the mobile system may be implemented within at least one of a manned or unmanned automotive system.

In other embodiments, the FSO communication apparatus may be implemented within a smart watch, a smart phone, a tablet, a laptop, a personal computer, a digital camera, a digital camcorder, a computer monitor, a TV, a projector, a wireless access point, or an internet-of-things (IoT) device.

The FSO communication apparatus may be implemented within a virtual reality (VR) system or an augmented reality (AR) system. In some embodiments, the FSO communication apparatus may be configured to provide transport for an uncompressed audio interface and/or an uncompressed video interface. The FSO communication apparatus may also be configured to provide transport for a high definition video interface. For example, the high definition video interface may be a High-Definition Multimedia Interface (HDMI) port, a DisplayPort interface port, or a Digital Visual Interface (DVI) port.

The FSO communication apparatus may be configured to provide transport for a high speed computer interface. In certain embodiments, the high speed computer interface may be a Peripheral Component Interconnect Express (PCI-Express) interface, a Universal Serial Bus (USB) interface, a Serial ATA (SATA) interface, or an Ethernet interface. In other embodiments, the high speed computer interface may be a gigabit interface converter (GBIC) interface port, a small form-factor pluggable (SFP) interface port or a 10 Gigabit Small Form Factor Pluggable (XFP) interface port. In other embodiments the high speed computer interface may be an InfiniBand (IB) interface.

In certain embodiments, the FSO communication apparatus may further include a collimator disk, a collimator lens, one or more optical band select filters, and/or one or more optical polarizers. A first LED of the array of optical sources may be configured to transmit at a first wavelength and a second LED of the array of optical sources may be configured to transmit at a second wavelength. A third LED of the array of optical sources may also be configured to transmit at a third wavelength. Similarly, this approach can be extended to embodiments with more than three wavelengths.

In certain embodiments, the FSO communication apparatus may further comprise an array of optical detectors. Each optical detector of the array of optical detectors may be electrically coupled with an optical source of the array of optical sources providing an array of optical repeaters. Each optical repeater of the array of optical repeaters may be configured to receive an optical signal from a centrally located optical source within the FSO communication apparatus.

In other embodiments, each optical source of the array of optical sources may be a coherent optical source. For example each optical source may be a laser diode.

In another embodiment, an FSO communication apparatus providing electrically controlled beam steering is disclosed. The FSO communication apparatus includes an array of optical sources wherein each optical source of the array of optical sources is positioned to provide a cumulative far field radiation pattern having a contour resembling the general shape of a spherical dome. Each optical source of the array of optical sources may be a non-coherent optical source.

In some embodiments the spherical dome, generally defining the contour of the cumulative far field radiation pattern, may have a ratio of a height to a radius of an associated sphere that is greater than 50 percent. In other embodiments, the ratio may be greater than 70 percent. In still other embodiments, the ratio may be greater than 90 percent.

According to another embodiment, a floating device includes a first FSO communication apparatus and a second FSO communication apparatus. The first FSO communication apparatus may be configured to establish a first communication channel with a first aircraft. The second FSO communication apparatus may be configured to establish a second communication channel with a first underwater vehicle. The floating device may be configured to relay data between the first aircraft and the first underwater vehicle.

The first FSO communication apparatus may include a first array of optical sources wherein each optical source of the first array of optical sources may be positioned to provide a first cumulative far field radiation pattern having a contour resembling a general shape of a first spherical dome. The second FSO communication apparatus may also include a second array of optical sources wherein each optical source of the second array of optical sources is positioned to provide a second cumulative far field radiation pattern having a contour resembling a general shape of a second spherical dome. Each optical source of the first array of optical sources may be an LED and each optical source of the second array of optical sources may also be an LED. In some embodiments the floating device may be a buoy.

According to another embodiment, an LED light detection and ranging (LEDAR™) apparatus provides electrically controlled pulse steering and detection. The LEDAR™ apparatus includes an array of LEDs wherein each LED of the array of LEDs is positioned to provide a cumulative far field radiation pattern having a contour resembling a general shape of a spherical dome. The LEDAR™ apparatus also includes an array of optical detectors wherein each optical detector of the array of optical detectors is paired with an LED of the array of LEDs and positioned where a focal plane of each optical detector is perpendicular to a beam axis of the paired LED.

The LEDAR™ apparatus further may further comprise incoherent optical detection circuitry coupled with each optical detector of the array of optical detectors. The incoherent optical detection circuitry may be configured to measure received amplitude changes in reflected light from each optical detector. In some embodiments, each LED of the array of LEDs may be a surface emitting LED. In other embodiments, each LED of the array of LEDs may be an edge emitting LED. Also, each LED of the array of LEDs may be configured to have a transient response time of less than 500 ps.

In some embodiments, the spherical dome representing the cumulative far field radiation pattern may have a ratio of a height to a radius of an associated sphere greater than 50 percent. In other embodiments, a ratio of a height of the spherical dome to a radius of an associated sphere may be greater than 70 percent. In still other embodiments, a ratio of a height of the spherical dome to a radius of an associated sphere may be greater than 90 percent. In some embodiments one or more of the LEDs of the array of LEDs may be configured to operate at least partially within an infra-red spectrum, a deep infra-red spectrum, an ultra-violet spectrum, a deep ultra-violet spectrum, and/or a visible light spectrum.

In some embodiments, the LEDAR™ apparatus may be implemented within a stationary device. In other embodiments, the LEDAR™ apparatus may be implemented within a mobile system. The mobile system may be implemented within an aircraft system. For example, the mobile system may be implemented within an UAV. In other embodiments, the mobile system may be implemented within at least one of an unmanned automotive system or a manned automotive system. In certain embodiments, the mobile system may be implemented within an autonomous automotive system.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
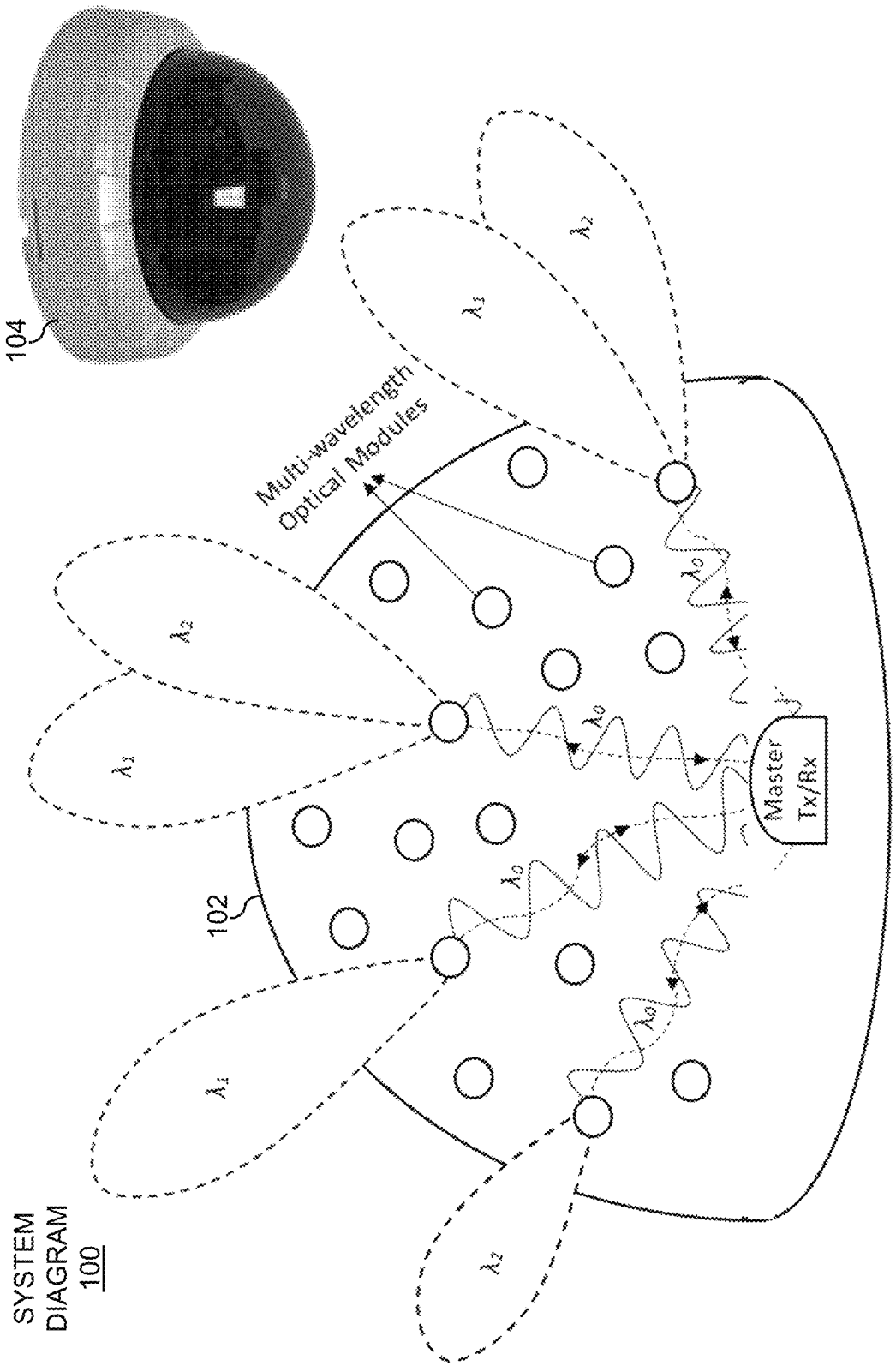
FIG. 1 depicts a system diagram illustrating a multi-wavelength, electronically steerable, wireless optical communication array dome (including a housing unit) according to an embodiment of the subject matter described herein.

The following description and drawings are illustrative and are not to be construed as limiting. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices, and systems for integration, beam forming and beam steering of ultra-wideband, free space optical (FSO) communication devices and systems (i.e. wireless optical communication devices and systems). Disclosure of these FSO devices and systems is organized as follows:

I. Electronically Steerable Optical Array for Wireless Communication Networks
   a. Multi-wavelength Optical Steerable Array for Commercial Airborne Platforms
   b. LED Imaging, Detection and Ranging (LEDAR™)
   c. Ultra-High Speed Electronically Steerable Optical Array for Wireless Communication Routers and Access Points
II. Backside Patterning to Improve LED External Efficiency
III. Optical Module with Integrated Optical Filters
IV. Wafer level packaging and assembly of optical modules with electronic circuits I. Electronically Steerable Optical Array for Wireless Communication Networks
   a. Multi-Wavelength Optical Steerable Array for Commercial Airborne Platforms Modern commercial airborne platforms such as Unmanned Aircraft Systems (UAS) integrate numerous sensors which are capable of capturing vast amounts of information such as high-resolution imagery. Such information often needs to be communicated in real-time directly or indirectly to ground personnel for analysis, decision and action. This requires the establishment of secure, airborne, wireless networks and gateways to facilitate communication of information among airborne platforms and ground terminals at extremely high data rates. Conventional microwave and millimeter wave radio systems struggle to meet the data rate requirements of airborne communication platforms due to insufficient bandwidth.

A novel, ultra-wideband, wireless optical communication link offers a unique combination of extremely high data rates, secure point-to-multipoint communication and all-weather performance for airborne networks. The target communication speed is far in excess of what is achievable with radio microwave and mm-wave modems and will offer a revolutionary leap in real-time data communication among airborne and space-based platforms. A multi-wavelength, optical steerable array based on ultra-high-speed Light Emitting Diodes (LEDs) and detectors for long distance wireless communication which represents significant improvement in bandwidth compared to existing radio solutions is designed. This technology addresses the explosive demand for high-data rate wireless connectivity in consumer mobile airborne applications.

An effective wireless communication network must be capable of maintaining secure communication channels in a mobile environment. The key requirements of such a network include the following:
1. Multi-beam capability to establish point-to-multipoint communication links.
2. Extremely high-data rate, full-duplex communication in a multi-user network.
3. Maintaining good dynamic link over long distances in all-weather conditions among fast-moving platforms.
4. Maintaining agility, security (multi-frequency) and immunity to interference and jamming
5. Minimal CSWAP (Cost, size, weight and power) suitable for naval and air-borne platforms.

In almost every category above, microwave and mm-wave radio solutions have fundamental limitations that arise from basic physical principles. LUMEOVA's electronically steerable, wireless optical technology based on ultra-fast LED/detectors offers a unique solution for this application and can be implemented as microcell access points. This technology addresses the explosive demand for high-data rate wireless connectivity in consumer mobile airborne applications.

The key advantages of electronically steerable optical array for wireless networks include the following:
1. Electronically fast, steerable beams which can maintain good links among terminals whose positions and orientations can rapidly change in a dynamic environment.
2. Multi-beam, bi-directional capability of the optical modules supports point-to-multipoint communication links.
3. Secure communication through optical beams with wavelength hopping which are not susceptible to interference and jamming by virtue of spatial and wavelength diversity.
4. Extremely high data rates per individual node due to multi-wavelength, full-duplex communication link.
5. High transmission efficiency, immunity to atmospheric attenuation due to low path losses and all-weather performance through proper selection of the optical wavelengths.
6. Low power consumption due to low path losses and high quantum efficiency of optical LEDs as compared to transmission efficiency of linear microwave/mm-wave power amplifiers.
7. Small size (volume, weight) and cost of the optical array dome.

FIG. 1 depicts a system diagram 100 illustrating a multi-wavelength, electronically steerable, wireless optical communication array dome 102 (including a housing unit 104) according to an embodiment of the subject matter described herein. In one example, wireless optical communication array dome 102 may be mounted underneath the airborne platform. A similar and second dome can be mounted on top of the airborne platform to provide complete wireless coverage of the entire mission space. The dome includes a large array (hundreds or more) individual optical T/R modules each capable of operating at high data rates on one of multiple wavelength channels. Each module is designed to have a specific Field Of View (FOV) (or radiation pattern) through the proper design of the optical lens in the module package. In this configuration, both spatial (MIMO) and wavelength diversity can be achieved which will dramatically increase the total communication bandwidth of the network. Each T/R module can be turned on/off individually or as part of a group of modules to illuminate a narrow or wide sector in the network airspace.

The transmitted optical power of each module can be adjusted individually over a range of power levels. In a mobile combat environment, the position and orientation of each transceiver in the network can change rapidly. Therefore, it is critical that the network maintain good communication links with each node through electronic steering of the optical beams. The data streams contained in each beam can include a small number of preset "training bits" which can be used through a proper algorithm to estimate bit-error-rate (BER) of the link and dynamically determine the optimum steering angle of the beam within less than a millisecond.

One of the technical challenges of such array of high-data rate modules is the distribution and aggregation of ultra-fast data streams (several Gbps) among the individual modules. Disclosed are two possible approaches for distribution and aggregation of high-speed data from individual modules and the central processing unit (CPU) of each communication node.

Figure 2:
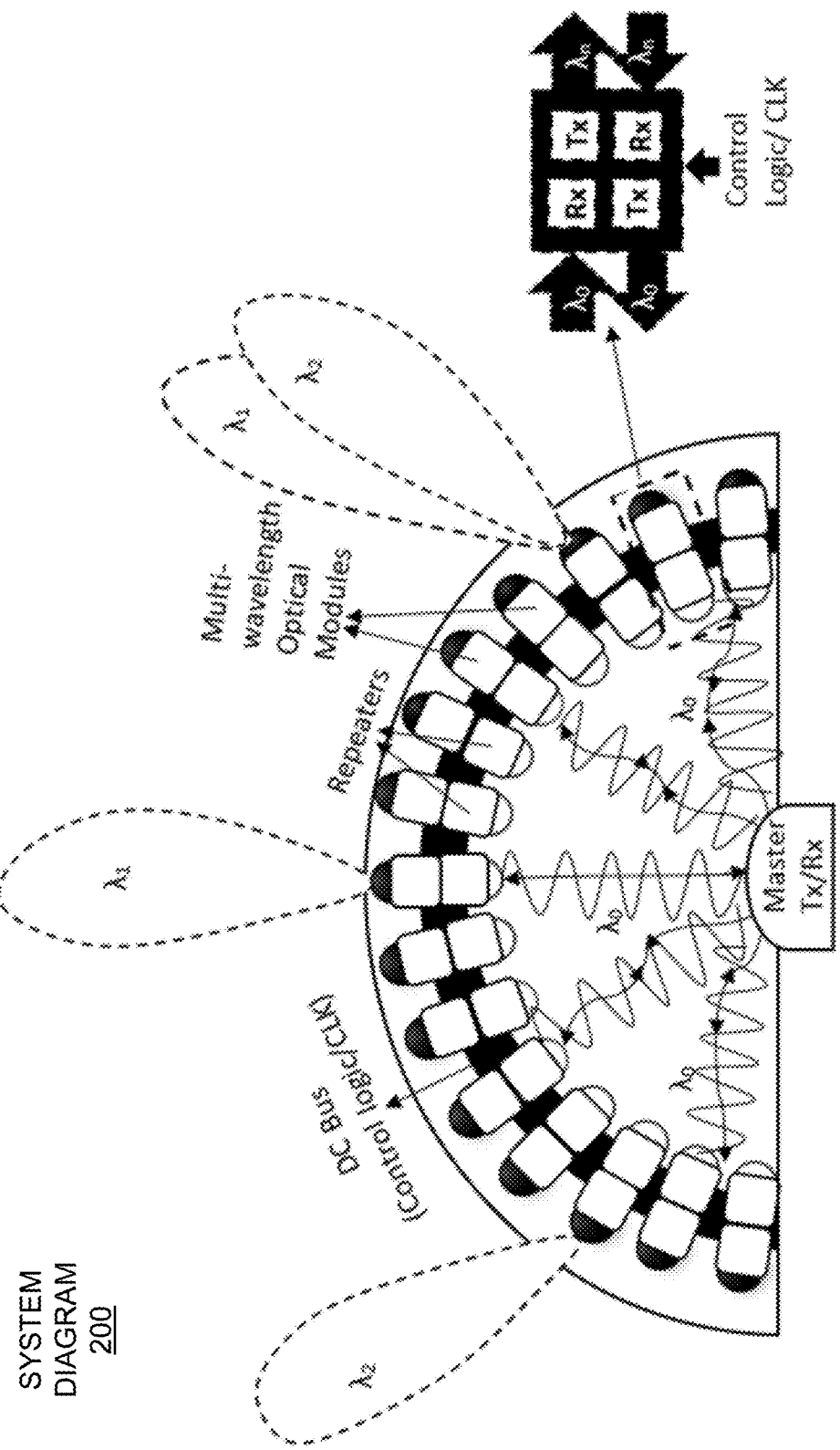
FIG. 2 depicts a system diagram illustrating a multi-wavelength optical steerable array with wireless optical master Tx/Rx feed according to an embodiment of the subject matter described herein.

FIG. 2 depicts a first approach of a system diagram 200 illustrating a multi-wavelength optical steerable array with wireless optical master Tx/Rx feed according to an embodiment of the subject matter described herein. A Master Tx/Rx optical module transmits and receives all data from individual modules inside the optical dome. This communication occurs at a separate wavelength and at multiple data rate of individual Tx/Rx data rates. For example, if each module can support up to 10 individual nodes in the network operating at 4 Gbps simultaneously, the Master Tx/Rx will communicated at 40 Gbps inside the dome with the array modules. Time Division Multiple Access (TDMA) can be used to assign data packets within the Master Tx/Rx data stream to individual modules. The individual modules are configured as a pair of back-to-back T/R modules in a repeater configuration communicating with the Master Tx/Rx on one wavelength and with other nodes in the network on other wavelength channels. The DC bus which carries the power and control signals to the array optical modules determine which modules are turned on and the Tx optical power level the wavelength channel of individual modules.

Figure 3:
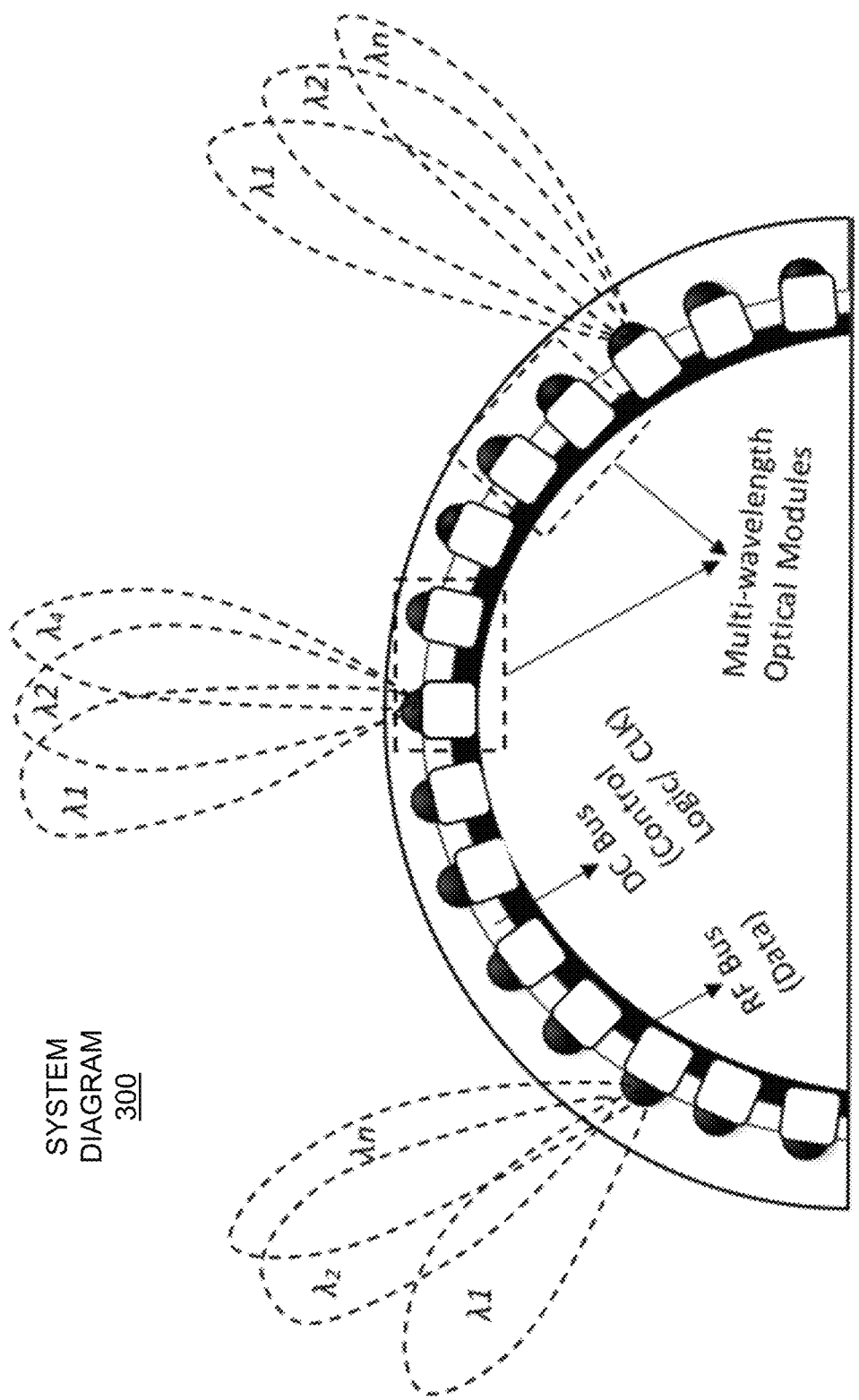
FIG. 3 depicts a system diagram illustrating a multi-wavelength dome shaped wireless optical steerable array with RF bus providing high-speed data stream and the DC bus providing power and control logic for individual Tx/Rx modules according to an embodiment of the subject matter described herein.

FIG. 3 depicts a second approach of a system diagram 300 illustrating a multi-wavelength dome shaped wireless optical steerable array with RF bus providing high-speed data stream and the DC bus providing power and control logic for individual Tx/Rx modules according to an embodiment of the subject matter described herein. The high-speed data stream is fed to the modules through RF signal distribution circuits designed on the high-frequency substrate that the optical modules are assembled. Similarly, the DC bus which carries the power and control signals to the array optical modules determine which modules are turned on and the Tx optical power level the wavelength channel of individual modules.

Figure 4:
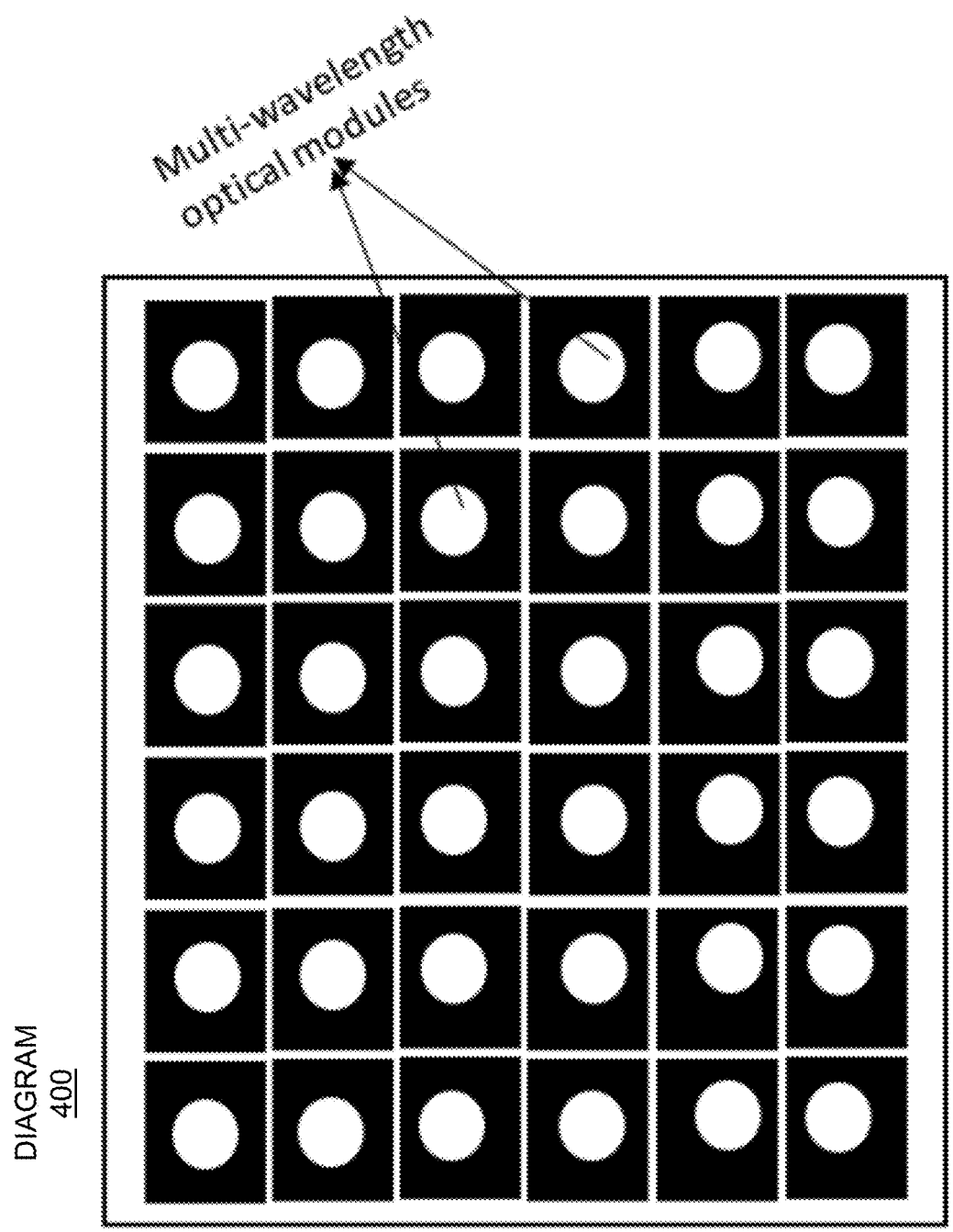
FIG. 4 depicts a diagram illustrating a multi-wavelength, ultra-high speed optical steerable linear array according to an embodiment of the subject matter described herein.

The concept of multi-wavelength, optical steerable array can also be designed using a square, rectangle or any arbitrary structures. The optical steerable array is realized using application specific design structures. These different designs can be used for point-to-point backhaul communication applications between buildings, towers etc. FIG. 4 depicts a diagram 400 illustrating a multi-wavelength, ultra-high speed optical steerable linear array according to an embodiment of the subject matter described herein. In this example a rectangular shaped optical steerable array is shown.

Figure 5:
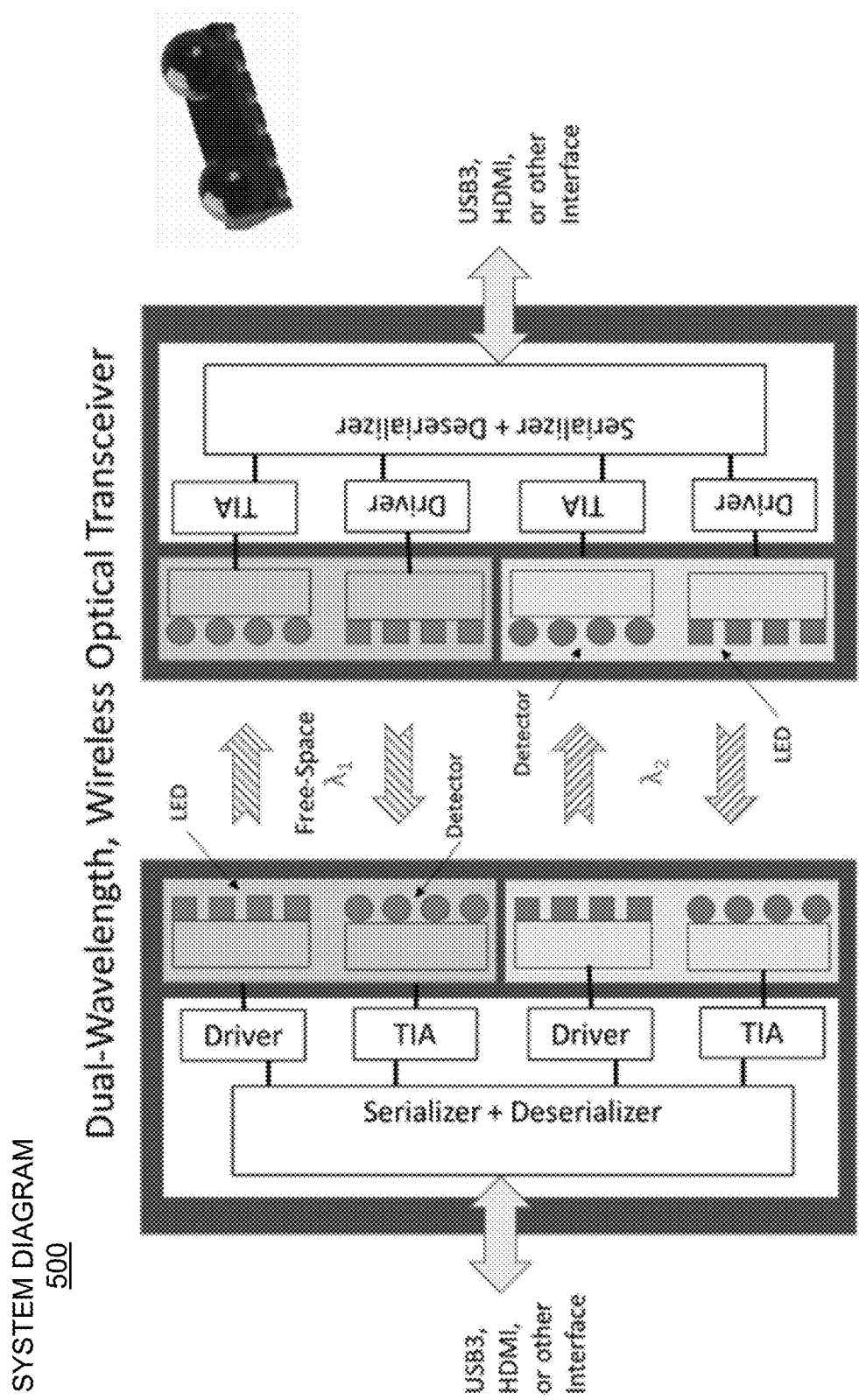
FIG. 5 depicts a system diagram illustrating a pair of LUMEOVA dual-wavelength optical wireless transceiver (Tx/Rx) modules. The inset shows the picture of an assembled optical wireless Tx/Rx module. according to an embodiment of the subject matter described herein.

FIG. 5 depicts a system diagram 500 illustrating a pair of LUMEOVA dual-wavelength optical wireless transceiver (Tx/Rx) modules according to an embodiment of the subject matter described herein. An individual dual-wavelength optical transceiver module includes two ultra-high-speed LED and detector pairs and a SiGe chip containing the high speed analog and digital interface. The optical lenses on the package are designed for an optimum individual beam width for the array. The physical size of the optical module can be made small (e.g. 3×6 mm$^2$) which will allow integration of several hundred or even thousands of modules in a small optical array dome with low CSWAP. The dual-wavelength architecture of each module enables full-duplex communication with another airborne node or can be used to double data transmission in each direction. This approach can be expanded to multiple wavelengths within each module. Alternatively, adjacent modules can be designed to operate on different wavelength in the same manner as individual RGB color pixels on a high-resolution TV display. These optical modules can be implemented as microcells in base stations.

LEDs and photodetectors in the optical modules are based on GaAs, GaSb and GaN material systems optimized for ultra-high-speed operation, high optical power density (LED) and high quantum conversion efficiency to be implemented in base stations and access points. The secondary optics design is vital to meet the desired requirements of the wireless optical communication link. The design of the transmitter collimator lens is optimized for small half-view angle for better security and efficiency of the communication link. Collimating lens are designed to achieve half-view angle of ±1° for a chip size of 0.2×0.2 mm$^2$ with efficiency of ~90% for 30 mm lens aperture. The divergence angle for wavelength of 1 µm is given by $\Theta = \tan^{-1}(\lambda/w) \approx 0.002°$ (e.g. very small).

Figure 6:
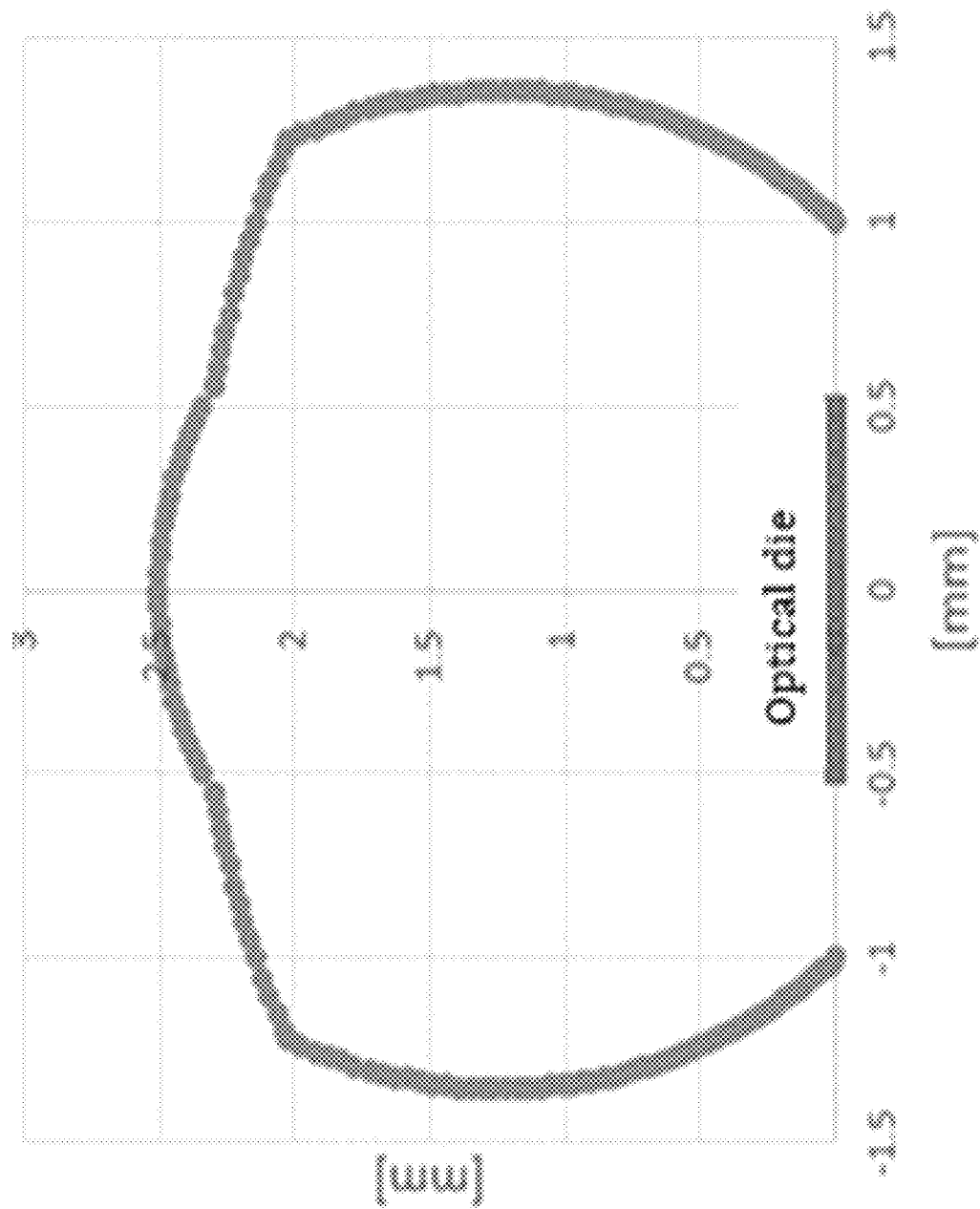
FIG. 6 depicts a graph illustrating a LUMEOVA collimating lens design for wireless optical communication transceivers according to an embodiment of the subject matter described herein.

FIG. 6 depicts a graph 600 illustrating a LUMEOVA collimating lens design for wireless optical communication transceivers according to an embodiment of the subject matter described herein. The divergence angle can be further reduced by selecting a lower wavelength emission (Ultra-violet LED).

The wireless optical communication link budget takes into consideration channel impairments due to absorption and scattering. The outcome of this analysis determines the required system parameters such as optical transmit power, receiver sensitivity, radiation beam width, pattern and steering, range, modulation scheme and array requirements. TABLE I shows the calculation of the link budget for optical wireless communication using LUMEOVA designed transceivers. The calculations are shown for a link distance of 20 km. The minimum detectable sensitivity versus the signal data rate is shown in TABLE II. A free space optics link budget calculation in the following equations:

$$P_{RX} = P_{TX} + G_{TX} + \Omega_{RX}$$

$P_{RX}$=Received Power (dBm)
$P_{TX}$=Transmitted Power (dBm)
$G_{TX}$=Transmitter Gain (dB)=$(4R/S)^2$ $$\Omega_{RX} = \text{Receiver Directivity (dB)} = (D/4R)^2$$

R=Distance
D=Diameter of the detector lens
S=Spot size

For R=20 km and half power beam width of ±0.5°, $G_{TX}$=47.2 dB. For R=20 km and half power beam width of ±1°, $G_{TX}$=41.2 dB

TABLE I

| Half Power Beam Width | Transmitted Power (dBm) | Receive Aperture Diameter (m) | | |
|---|---|---|---|---|
| | | 0.1 | 1 | 10 |
| | | Received Power (dBm) | | |
| ±0.5° | 20 | −50.9 | −30.9 | −10.9 |
| | 30 | −40.9 | −20.9 | −0.9 |
| | 40 | −30.9 | −10.9 | 9.1 |
| 1° | 20 | −56.9 | −36.9 | −16.9 |
| | 30 | −46.9 | −26.9 | −6.9 |
| | 40 | −36.9 | −16.9 | 3.1 |

TABLE II

| Data Rate (Gbps) | Minimum detectable sensitivity (dBm) |
|---|---|
| 0.1 | −40 |
| 1 | −30 |
| 10 | −20 |
| 20 | −16 |

The aperture of the optical array module is about 10 cm. From TABLE I, we see that for the receive aperture diameter of 10 cm, minimum transmit power of 30 dBm is required to detect signal of 100 Mbps with half power beam width of ±0.5°.

Figure 7:
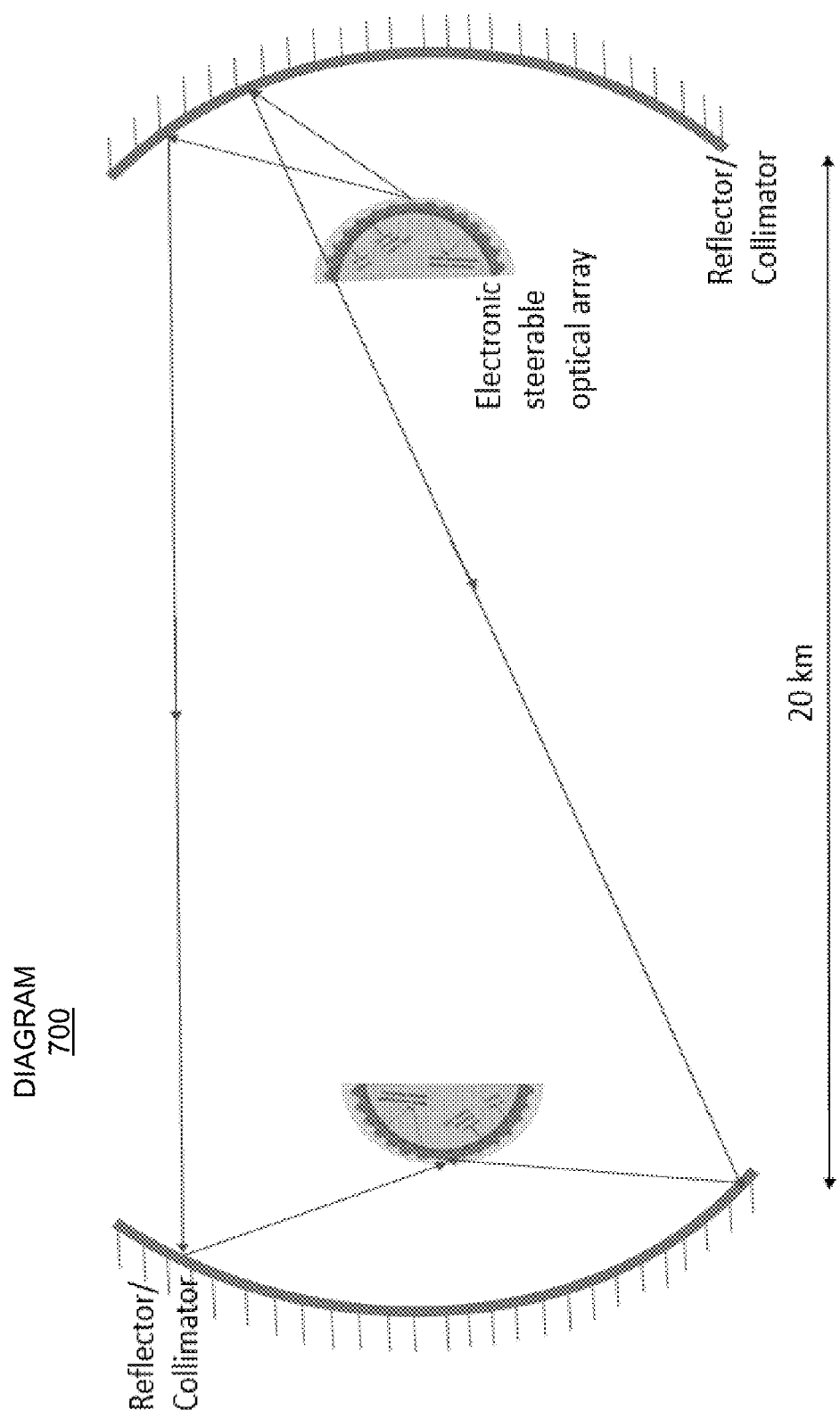
FIG. 7 depicts a diagram illustrating a reflector/collimator disk for wireless long distance communication according to an embodiment of the subject matter described herein.

FIG. 7 depicts a diagram 700 illustrating a reflector/collimator disk for wireless long distance communication according to an embodiment of the subject matter described herein. The effective receive aperture increased by 10 or 100 times with the incorporation of reflector/collimator disk. The optical array module is positioned in the focal place of the reflector disk. Increasing the effective receive aperture by the collimating disk will enable to detect signal of higher data rate for the same transmit power. As previously shown in TABLE I, for a transmit power of 30 dBm, the optical signal of 10 Gbps can be detected when the effective receive aperture is increased to 1 m. The reflector/collimator disk is positioned mechanically in the general direction of the transmitter. The signal tracking is provided by electronic steering of the optical array module. From the calculations illustrated in TABLE I, it is evident that with the proper collimator/reflector optics design and optimizing the transmitted power, the wireless optical link can be effectively used in excess of 20 km.

Figure 8:
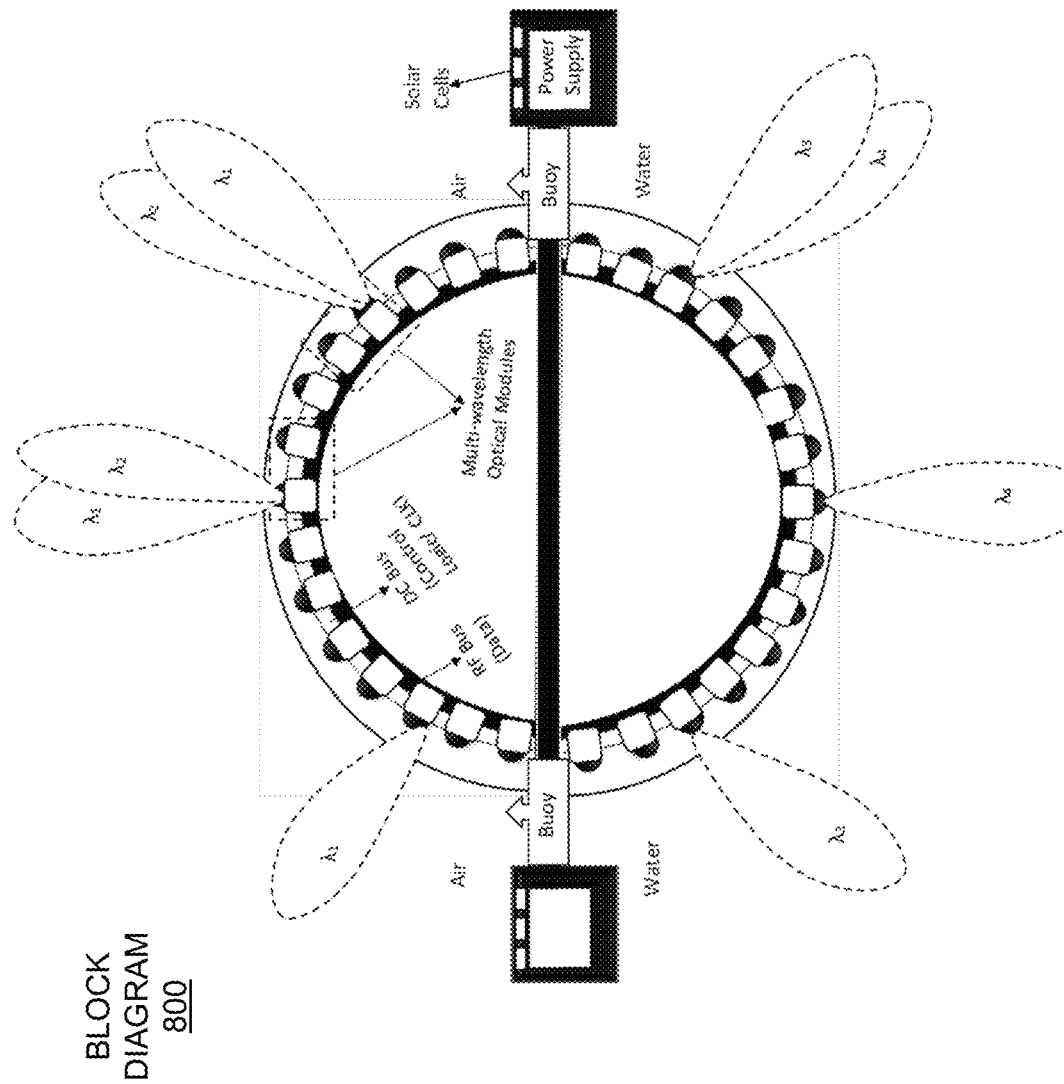
FIG. 8 depicts a block diagram illustrating a multi-wavelength, electronically steerable, wireless optical device for communication from underwater to air based platforms and vice-versa according to an embodiment of the subject matter described herein.

FIG. 8 depicts a block diagram 800 illustrating a multi-wavelength, electronically steerable, wireless optical device for communication from underwater to air based platforms and vice-versa according to an embodiment of the subject matter described herein. Basically, the concept of multi-wavelength, optical steerable array can be extended to design an optical dome for high speed underwater wireless communication. The dome includes numerous optical modules capable of transmitting and receiving two-wavelength signals. The optical modules include LUMEOVA designed ultra-high speed transceivers. The optical modules are actuated by either an RF bus or a master transceiver located at the center of the dome. The optical link between the master LED and the repeaters is bi-directional. The signal from the master LED is sensed by the repeaters which actuate the optical modules. While receiving signals, the optical modules transmit the information to the repeaters, the repeaters communicate to the master LED via the optical link in the opposite direction. The master LED operates at higher bandwidth than the LEDs in the optical module. The advantage of using LEDs as the transmitters is to increase the field of view (FOV) of the array. LEDs can inherently operate over a wide FOV. The optical steerable array for underwater communication can be used in conjunction with an optical dome designed for free space long distance optical wireless communication. The optical dome in the lower part of the FIG. 8 is submerged in water. The optical dome in seawater communicates by optical waves at multi-wavelength in the 'green' region of the spectrum. The optical modules in the dome is designed for ultra-high speed communication based on LUMEOVA designed GaAs based transceivers for underwater communication. The optical dome in the air communicates in the free space using multi-wavelength (infrared-ultraviolet) optical waves. The products can address the critical limitations of the current underwater communication with host platforms using acoustic modems.

b. LED Imaging, Detection and Ranging (LEDAR™)

Figure 9:
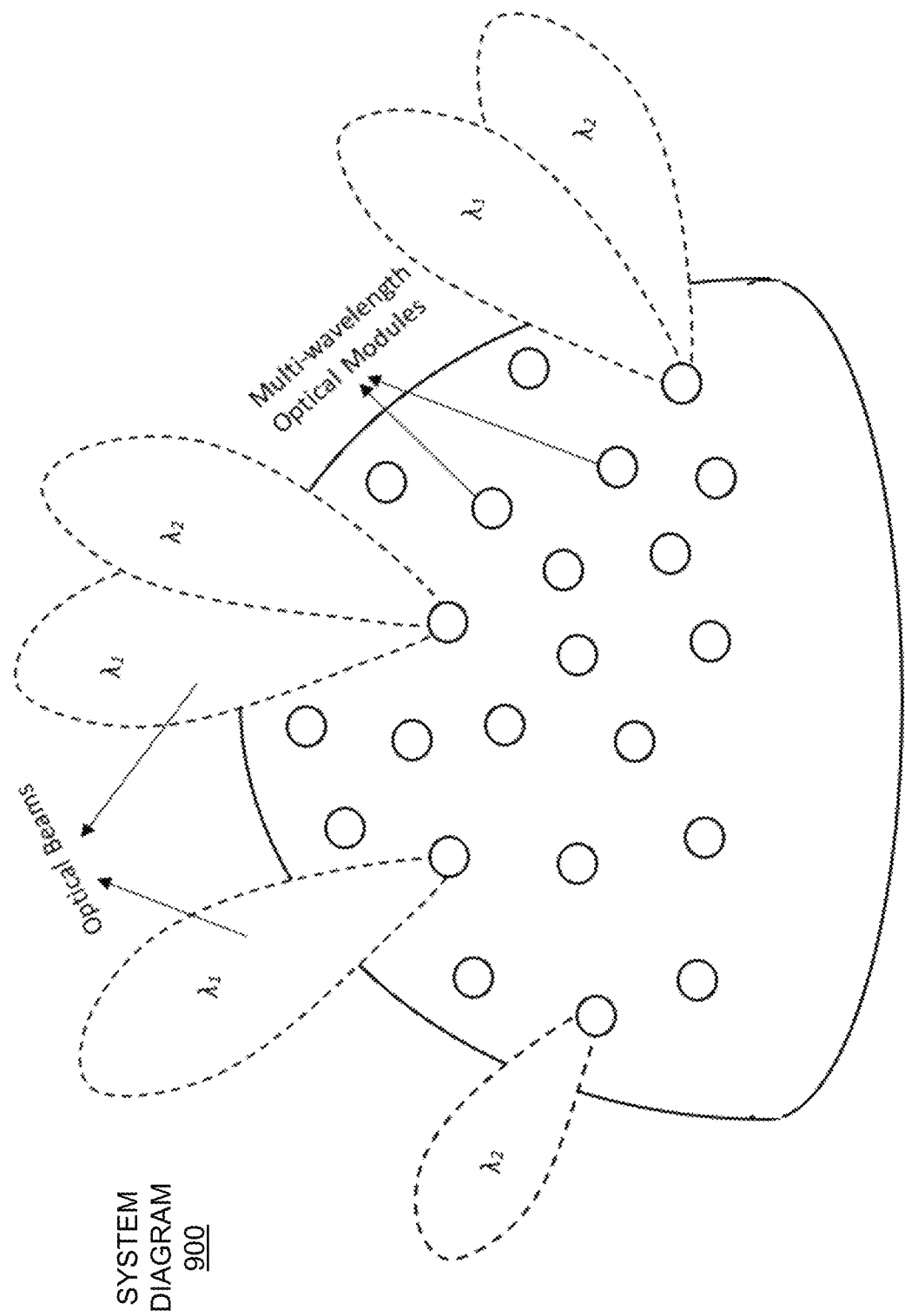
FIG. 9 depicts a system diagram illustrating a LEDAR™ (LED imaging, Detection and Ranging) for object-detection according to an embodiment of the subject matter described herein.

FIG. 9 depicts a system diagram 900 illustrating a LEDAR™ (LED imaging, Detection and Ranging) for object-detection according to an embodiment of the subject matter described herein. LEDAR™ (LED imaging, Detection and Ranging) is an object-detection system that uses light waves from ultra-fast LEDs to determine the range, angle, or velocity of objects. It can be used to detect aircrafts, motor vehicles, weather formations, and terrain. Unlike a LiDAR system which uses light from lasers for detection and imaging, LEDAR™ uses light waves from LEDs instead. The high frequency of light waves are highly advantageous in detecting and imaging objects of smaller dimensions. LEDAR™ is based on the principle of measuring distance through the time taken for a pulse of light to reach the target and return. A sharp rise and fall time of the transmit/receive signal is required to precisely detect a moving object with high resolution. Airborne LEDAR™ can perform the identification and accurate recording of objects to sub-meter accuracy. Ultra-high-speed LEDs and photo-detectors are used as illuminators and receivers respectively. The system of FIG. 9 also includes an optical dome (not shown) in which the ultra-high optical modules are embedded. The optical modules include ultra-high speed transceivers operating at single or multiple wavelength(s).

Figure 10:
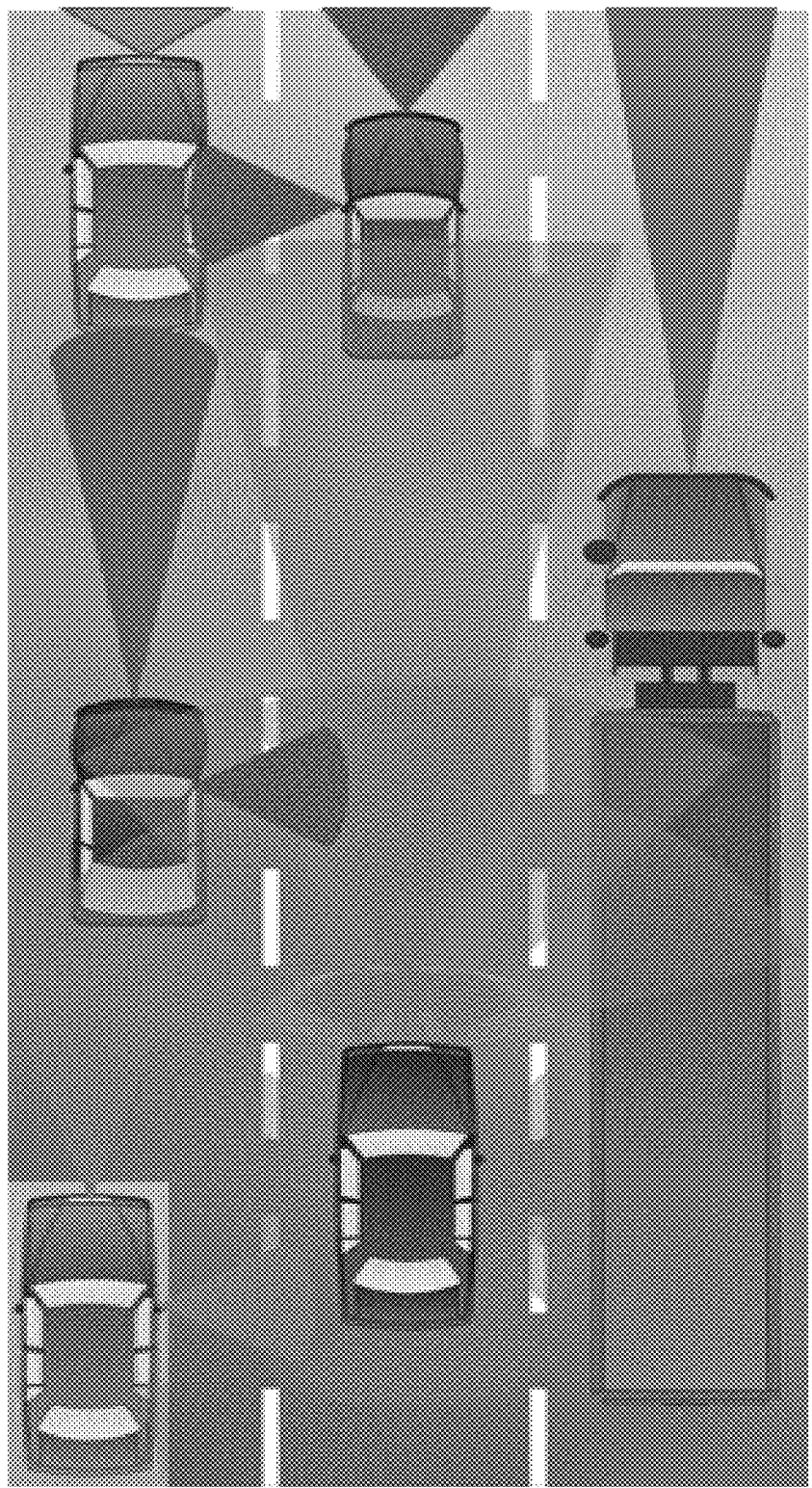
FIG. 10 depicts a diagram illustrating LEDAR™ used as active safety system in vehicles according to an embodiment of the subject matter described herein.

FIG. 10 depicts a diagram 1000 illustrating LEDAR™ used as active safety system in vehicles according to an embodiment of the subject matter described herein. The electronically steerable optical dome can be installed in automotive vehicles and self-driving cars for real time sensing and collision warning systems. Beyond passive safety systems, active safety systems play a major role in reducing traffic fatalities. Active safety systems include adaptive cruise control and collision warning systems with automatic steering and braking intervention. Electronically steerable optical dome can effectively be used as active safety system in automotive vehicles. In a collision warning system, an optical dome emits signals reflected from objects ahead, at the side and to the rear of the vehicle and are captured by multiple receivers integrated throughout the vehicle. The optical collision warning system can detect and track objects in the frequency domain triggering a driver warning of an imminent collision and initiate electronic stability control intervention.

c. Ultra-High Speed Electronically Steerable Optical Array for Wireless Communication Routers and Access Points The commercial mobile, wireless industry is facing the problems of data traffic explosion, and radio wireless connectivity bandwidth limitation. The ever-increasing consumer appetite for mobile multimedia content is driving strong demand for smart phone and tablets based on 4G, LTE radio technology. Today's mobile devices equipped with high-resolution displays and cameras are capable of capturing large amount of multi-media content that can be stored locally on the device. However, transferring and sharing of such content among devices require short-range connectivity modems capable of delivering speeds of 20 Gbps or higher.

Figure 11:
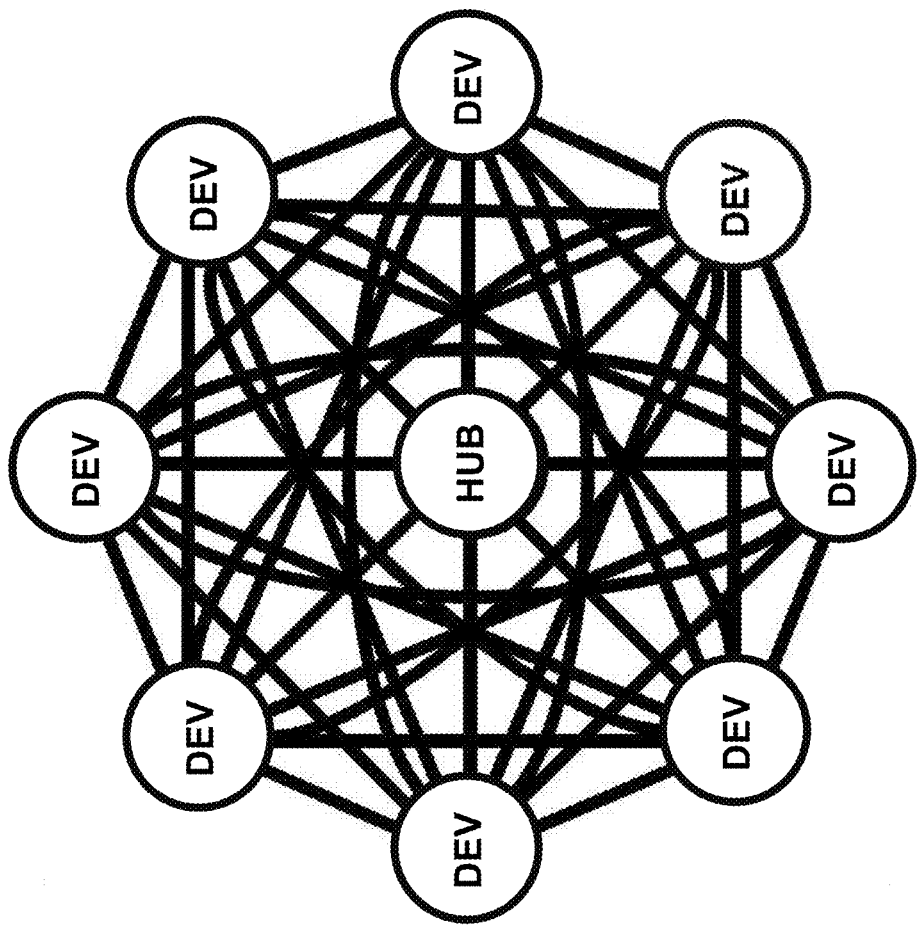
FIG. 11 depicts a system diagram illustrating an access bub for wireless Local Area Network (LAN) according to an embodiment of the subject matter described herein.

FIG. 11 depicts a system diagram 1100 illustrating an access hub for a wireless Local Area Network (LAN) according to an embodiment of the subject matter described herein. The access hub can communicate wirelessly (i.e. optically) with one or multiple devices on one or more wavelength (frequency) channels. The HUB node is at the center and the nodes at the ends of the spokes are referred to as device (DEV) nodes. High speed communication occurs between the HUB and the DEV spokes. The Electronically Steerable Optical Array of FIG. 1 offers wavelength and spatial diversity for multiple optical LANs. Some such devices and systems are disclosed in International Application No. PCT/US2019/012989; titled METHODS, DEVICES, AND SYSTEMS FOR TIMING AND BANDWIDTH MANAGEMENT OF ULTRA-WIDEBAND, WIRELESS COMMUNICATION CHANNELS; filed Jan. 10, 2019; the contents of which are incorporated by reference herein.

Figure 12:
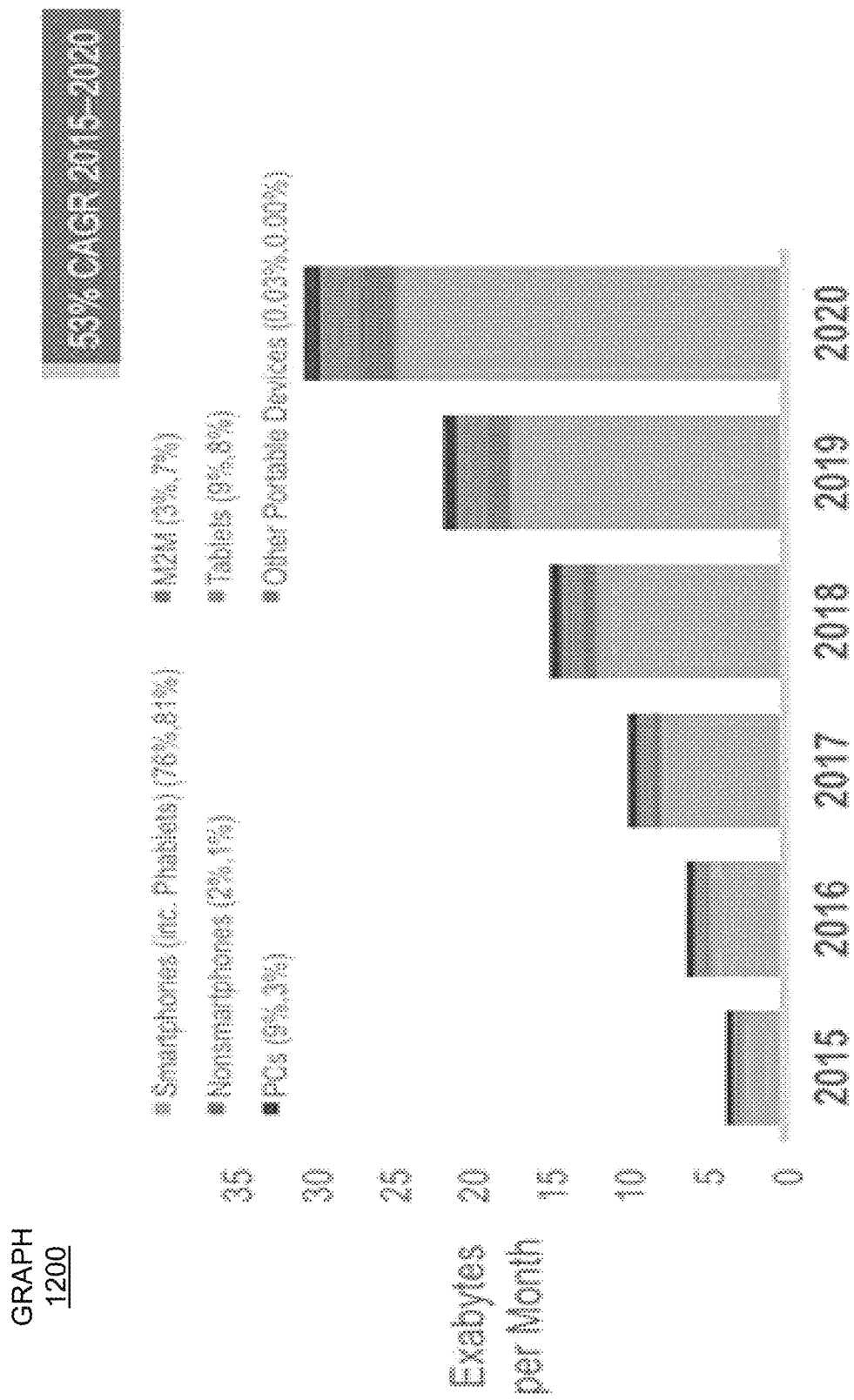
FIG. 12 depicts a graph illustrating a forecast of mobile data traffic (Source: Cisco VNI Mobile Forecast, 2016) according to an embodiment of the subject matter described herein.

FIG. 12 depicts a graph 1200 illustrating a forecast of mobile data traffic (Source: Cisco VNI Mobile Forecast, 2016) according to an embodiment of the subject matter described herein. The dilemma for the mobile industry is that the capabilities of radio, wireless modems such as Wi-Fi are not keeping up with the exponential growth of multimedia content on smart phones and tablets. In fact, without data compression, wired connectivity via cables is the only way to transport large amount of data among devices or between the device and the cloud. While new generation Wi-Fi standards (802.11ad) are being introduced to increase network speed, the new standards are still inadequate to meet the throughput requirement of Ultra-High Definition 4 K (HDMI2.0, 20 Gbps) video content.

The data throughput of radio transceivers is inherently limited by the availability of commercial radio spectrum and their limited tuning range. For example, in IEEE802.11ac standard, the channel bandwidths are specified at either 80 MHz or 160 MHz in the 5 GHz ISM band. With channel bonding, Wi-Fi 802.11ac transceivers have been operated at speeds approaching 1 Gbps. A single user operating at such speeds will use up the entire bandwidth of the local hot-spot! The IEEE802.11ad standard (WiGig™) takes advantage of higher spectrum availability in the 57-64 GHz band (V-band). With about 7 GHz spectrum available, speeds of 5 Gbps have been demonstrated and potential speeds of 7 Gbps using multi-carrier OFDM modulation are being pursued. Millimeter-wave radio transceivers have significant complexity and costs associated with them and suffer from multi-path and other channel impairments in an indoor operation. Additionally, the ranges of 802.11ad Wi-Fi modems are limited to 2-3 meters even with complex beam-forming antennas. A competing wireless radio solution (802.11ax) called MU-MIMO (Multi-User, Multi-Input, Multi-Output) operating in the 2.4 GHz and 5 GHz unlicensed bands is getting momentum due to the better propagation characteristics in those bands. This system utilizes 4×4 MIMO configurations to create spatial diversity and enable 1.7 Gbps or higher throughput per user in a Wi-Fi hotspot.

The electronically steerable optical dome can be used as multi-user access point for ultra-high speed communication hotspot. The proposed solution will integrate a number of multi-beam, multi-wavelength optical transmit/receive (T/R) modules in an electronically, steerable array which enable secure, real-time, high-speed communication among multiple mobile and fixed communication nodes as shown in FIG. 2 and FIG. 3. The scanning optical array can maintain effective communication links among multiple mobile access points. The electronically steerable high-speed access point can be installed both inside a building and outdoor for ultra-high speed wireless communication links for multiple mobile and fixed nodes. The multiple nodes are supported either by multi-beam and multi-wavelength capability or multi-beam spatially separated channels. Multi-beam (MIMO spatial diversity), multi-wavelength (frequency diversity) operation along with electronic beam steering offer ultra-wideband, full-duplex communication links among various nodes in the network and the gateway that are moving and varying orientation relative to each other in a dynamic environment. With optimum selection of wavelengths, the entire indoor/outdoor network can operate in all-weather conditions over a vast area with minimal susceptibility to interference and jamming.

The key advantages of using electronically steerable high speed hotspot for wireless networks are: 1) Extremely high data rates per individual node, 2) Electronically fast, steerable beams which can maintain good links among mobile nodes, 3) Low path losses and all-weather performance through proper selection of the optical wavelengths, 4) Secure communication through optical beams with wavelength hopping which are not susceptible to interference and jamming by virtue of spatial and wavelength diversity, 5) Low power consumption due to low path losses and high quantum efficiency of optical LEDs as compared to transmission efficiency of linear microwave/mm-wave power amplifiers, and 6) Small size (volume, weight) and cost for the optical array dome.

II. Backside Patterning to Improve LED External Efficiency

The MQW GaAs based LEDs have extremely high internal quantum efficiency close to 99%. However, the external quantum efficiency of GaAs LEDs is greatly confined as a result of narrow escape cone and Fresnel loss of the radiation at the semiconductor-air interface. The critical angle of LEDs is typically very low due to the large refractive index difference semiconductor and air. The escape cone at the interface of GaAs (RI=3.52) and air at 1 μm wavelength is 16.5°, as imposed by Snell's law. This narrow escape cone for spontaneous emission covers a solid angle of $\approx (n_m^2/4 n_s^2) \times 4 \Pi$ sr, $n_s$ is the refractive index of the semiconductor and $n_m$ is the refractive index of the lens material or free space. For GaAs based LEDs, a mere 2% of the internally generated light can escape into free space, the rest suffering total internal reflection and reabsorption. Considering Fresnel reflection loses for both TE and TM polarization radiations, the transmissivity between air and semiconductor interface is given by $T=4\,n_s/(1+n_s)^2$. The Fresnel reflection loss between GaAs and air interface is 30%. Because of total internal reflection and Fresnel reflection losses caused by high index of GaAs based materials, only a fraction of light can escape from GaAs material into air. This diminishes the external efficiency of GaAs based LEDs considerably. The external efficiency of GaAs LEDs is around 1.4%.

The LED external efficiency is increased by, 1) texturing the LED surface to the escape cone area, 2) deposition of anti-reflection coating (ARC) at the interface of semiconductor and air to diminish the Fresnel reflection loss. The key to increasing the photon escape probability from the semiconductor die is to increase the emission escape cone. This is done by patterning the semiconductor surface through which the optical radiation is extracted. In the flip-chip LED design where the optical radiation is extracted from the backside, pattering is implemented on the backside surface to increase the LED external efficiency. Anti-reflection coating is deposited conformably over the patterned surface to diminish the losses due to Fresnel reflection. LUMEOVA developed a novel surface pattering design which improves the external efficiency of LEDs significantly.

Figure 13:
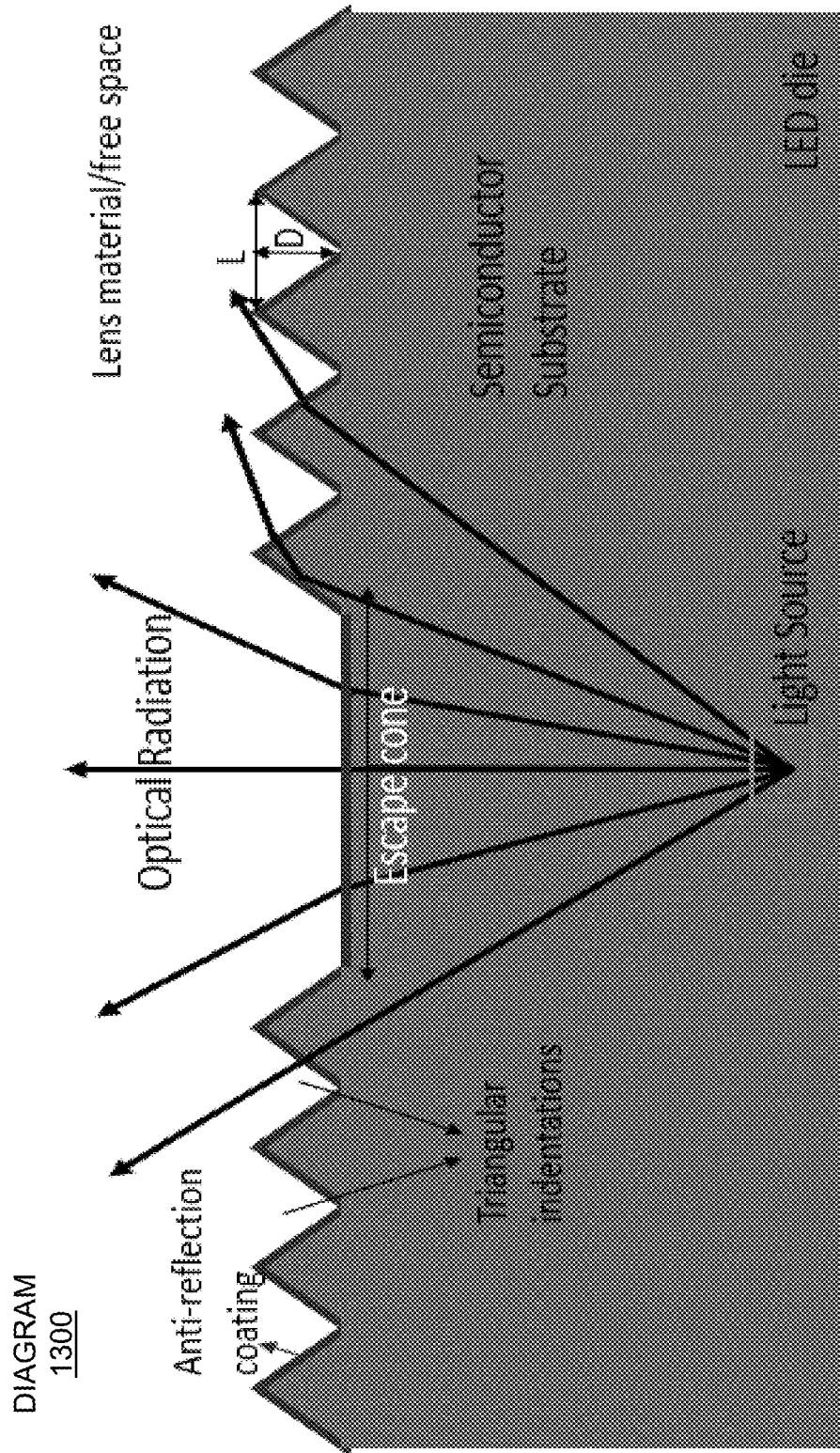
FIG. 13 depicts a diagram illustrating an example of surface pattern design to increase the LED external efficiency according to an embodiment of the subject matter described herein.

FIG. 13 depicts a diagram 1300 illustrating an example of surface pattern design to increase the LED external efficiency according to an embodiment of the subject matter described herein. In this example, a backside surface pattern design on GaAs substrate is illustrated. The backside surface is patterned using triangular-shaped indentations of length 'L' and depth 'D'. The backside surface above the LED active region which is inside the escape cone of the material is kept flat. The flat surface is shaped as square, rectangular or circular depending on the radiation pattern of the light source.

Figure 14:
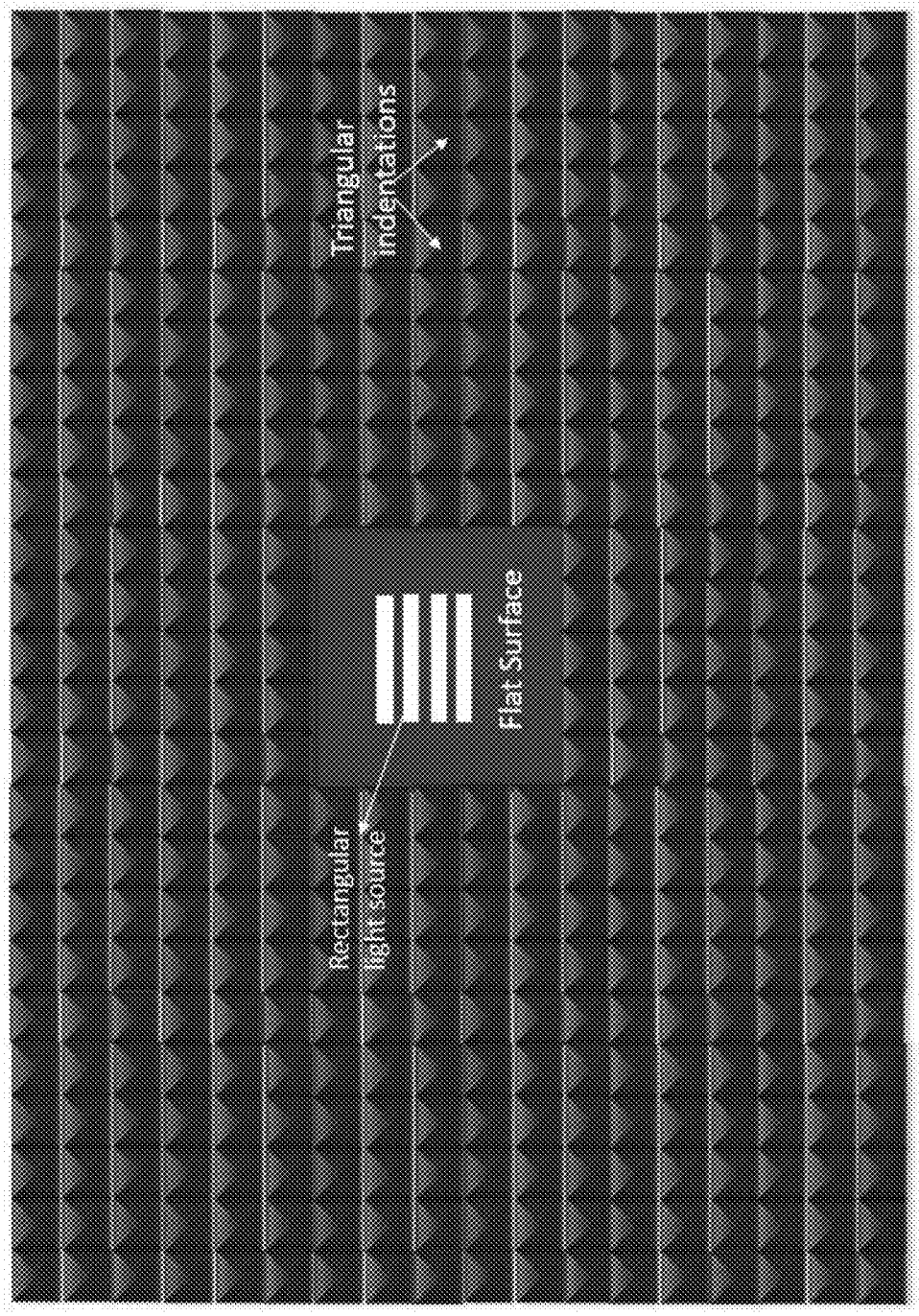
FIG. 14 depicts a diagram illustrating an example of top view of the LED patterned surface for rectangular light source according to an embodiment of the subject matter described herein.

FIG. 14 depicts a diagram 1400 illustrating an example of top view of the LED patterned surface for rectangular light source according to an embodiment of the subject matter described herein. Beyond the flat region, the backside surface is indented in triangular shapes. In this example, the backside flat region and the indentations are designed in squared shapes.

Figure 15:
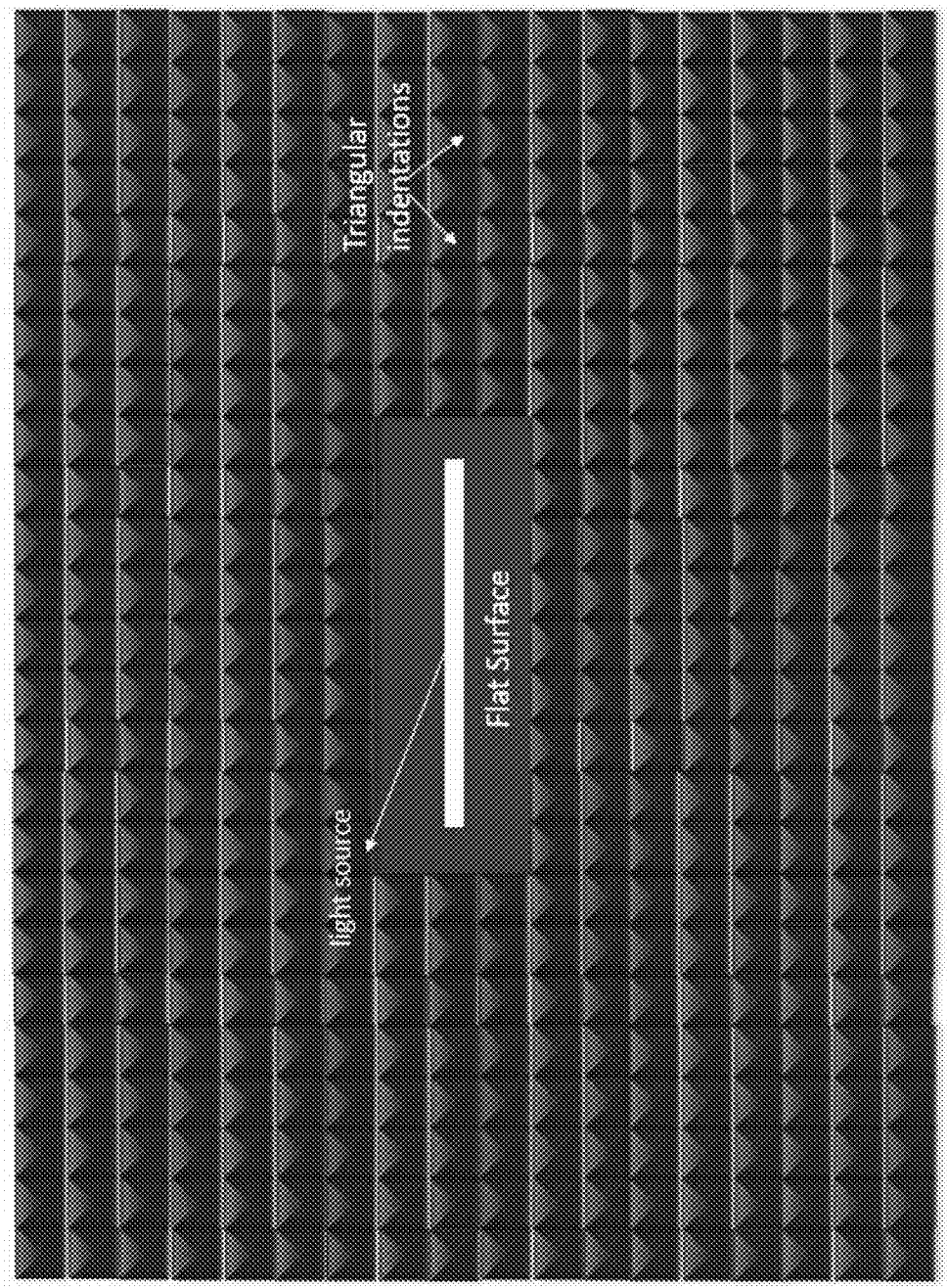
FIG. 15 depicts a diagram illustrating an example of top view of the LED patterned surface for line shaped light source according to an embodiment of the subject matter described herein.

FIG. 15 depicts a diagram 1500 illustrating an example of top view of the LED patterned surface for line shaped light source according to an embodiment of the subject matter described herein. The shapes of the indentations can be designed to be semi-spherical, hexagonal, triangular, rectangular or other shapes depending on the design requirements, material and processing techniques.

Figure 16:
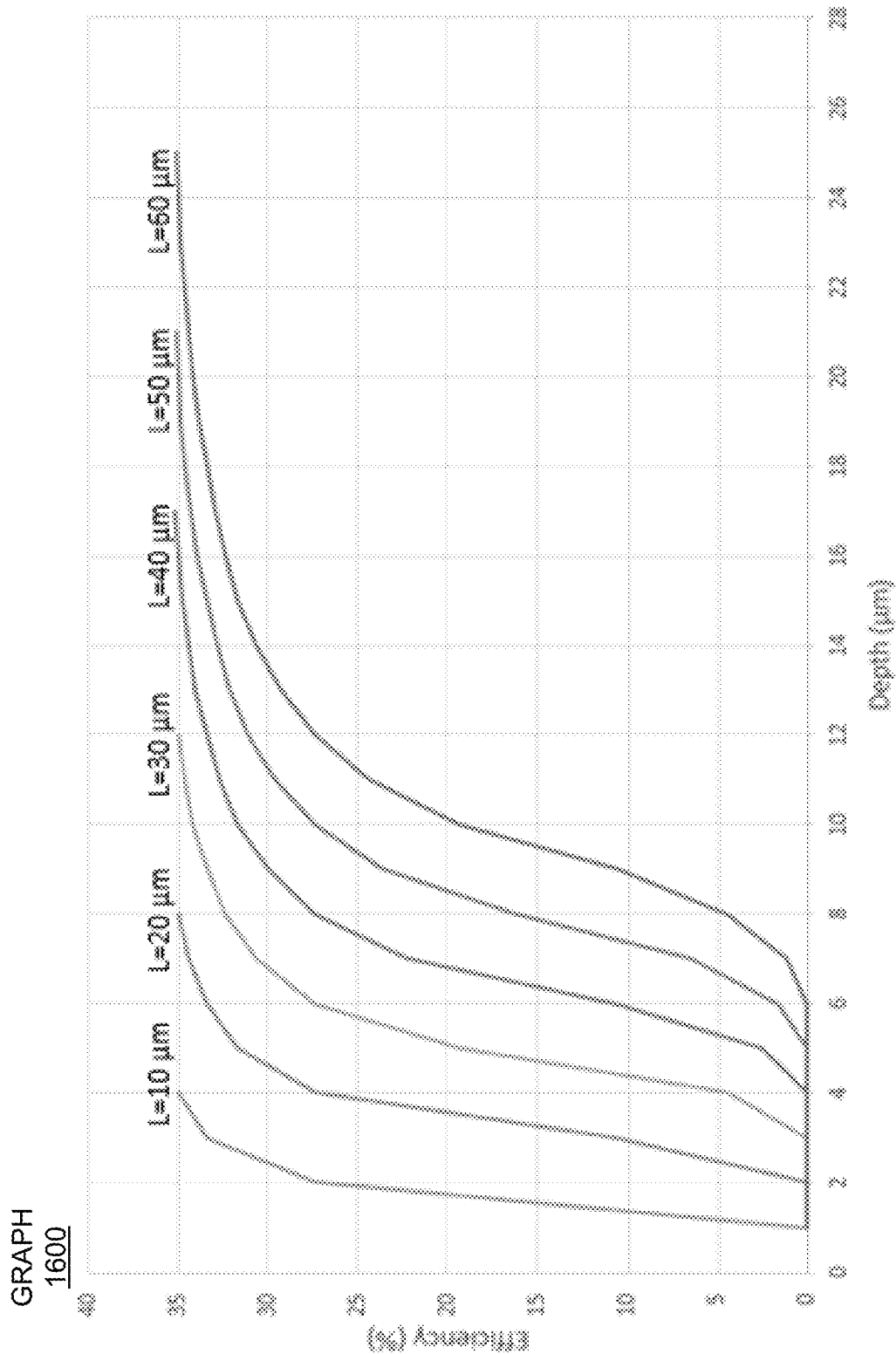
FIG. 16 depicts a graph illustrating an example of efficiency versus triangular indentation dimensions for GaAs based LED according to an embodiment of the subject matter described herein.

FIG. 16 depicts a graph 1600 illustrating an example of efficiency versus triangular indentation dimensions for GaAs based LED according to an embodiment of the subject matter described herein. The ratio of the indentations' depth and length determine the LED external efficiency as illustrated. Triangular indentations of length 10 µm and depth 4 µm, raise the external efficiency of GaAs LED from 1.4% to 35%. The novel surface texturing design to increase the LED external efficiencies can be implemented to other material systems like GaN, GaSb, InP, Si, Ge etc.

III. Optical Module with Integrated Optical Filter(s)

In order to efficiently use the wide optical spectra for high-speed wireless communication, LUMEOVA's WiRays™ wireless optical solution employs wavelength diversity, i.e. use of multiple, simultaneous wavelength (frequency) channels. Each optical channel (band) has its defined center wavelength and bandwidth which can be implemented through the use of an optical band select filter with optimum bandwidth. The optical band select filter comprises one or multiple layers of special optical coatings on glass or other material substrates with pre-determined index of refraction and thickness for each layer. Such filters are commonly used in optical systems such as camera optics to eliminate undesired optical signals. An example of such filters is anti-reflection (AR) coatings on optical camera lenses. Each module of LUMEOVA optical wireless transceiver (Tx/Rx) can incorporate an optical band select filter (e.g. bandpass filter with center wavelength designed for each channel wavelength). Such filters can also include an optical polarizing layer which converts the unpolarized transmitted light from an LED to a polarized light with specific polarization. Such a polarizing filter can be used to significantly enhance the communication link between the LED and detector by reducing reception of unwanted signals resulting from multi-path reflections that are common in short-range FSO communication. It can also double data throughput through the use of dual polarization diversity, i.e. simultaneous communication over the same wavelength channel using two orthogonal polarization filters. In LUMEOVA's solution, the optical band select filters with or without polarizing layer can be integrated into the FSO module by one of the following methods.

Figure 17:
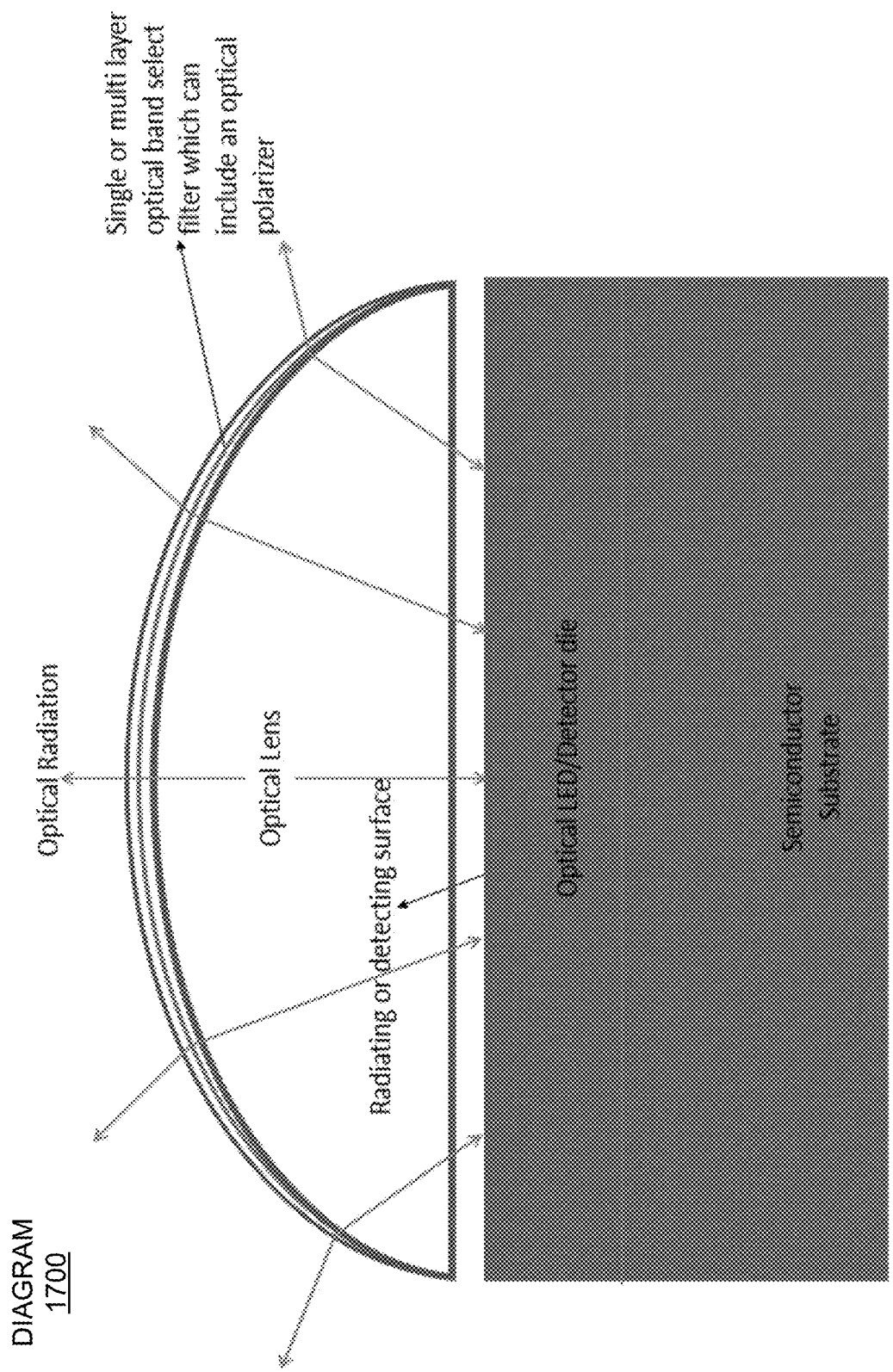
FIG. 17 depicts a diagram illustrating a single or multi-layer optical filter is deposited on top of the optical lens surface according to an embodiment of the subject matter described herein.
Figure 18:
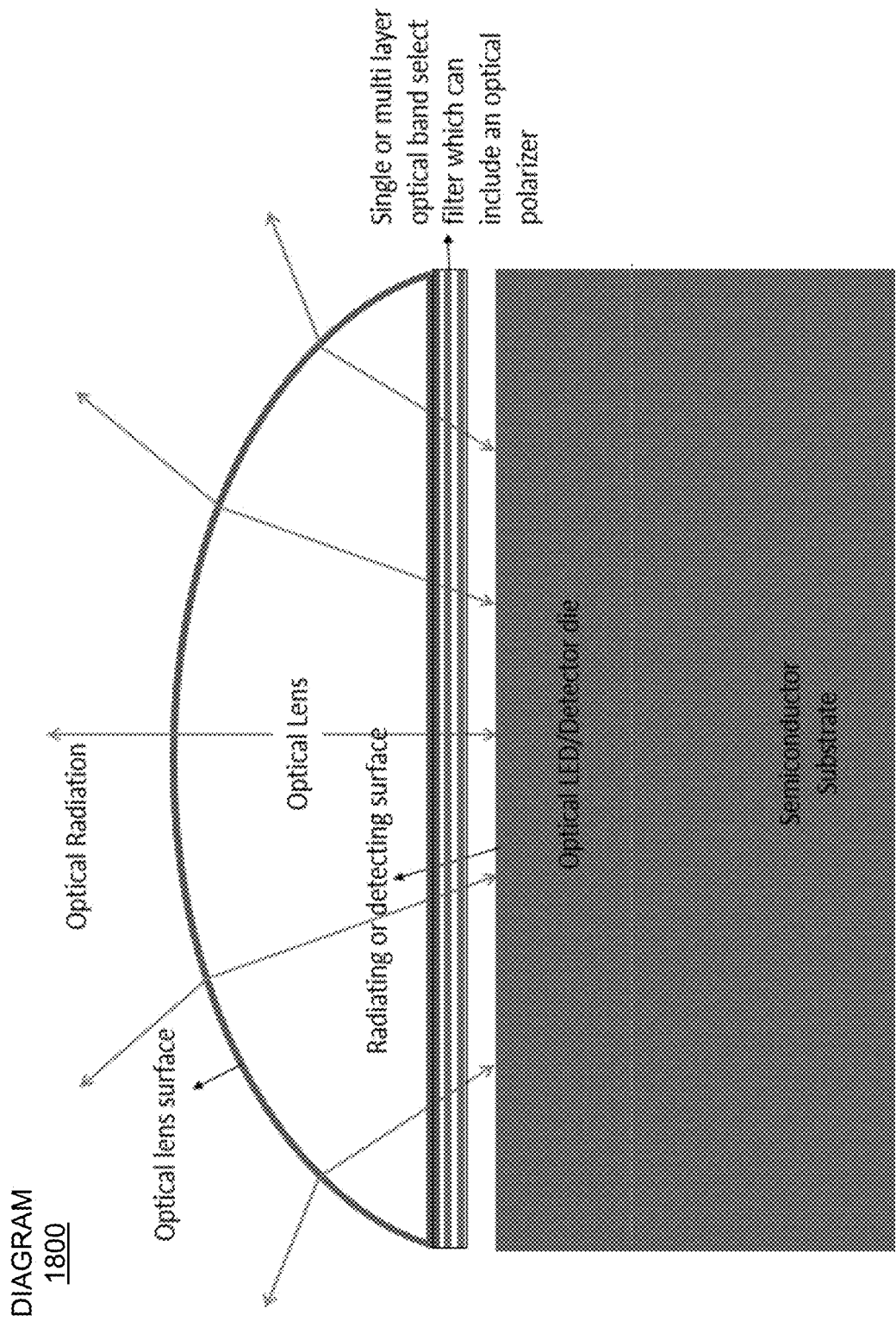
FIG. 18 depicts a diagram illustrating a single or multi-layer optical filter deposited on the bottom of the optical lens surface according to an embodiment of the subject matter described herein.
Figure 19:
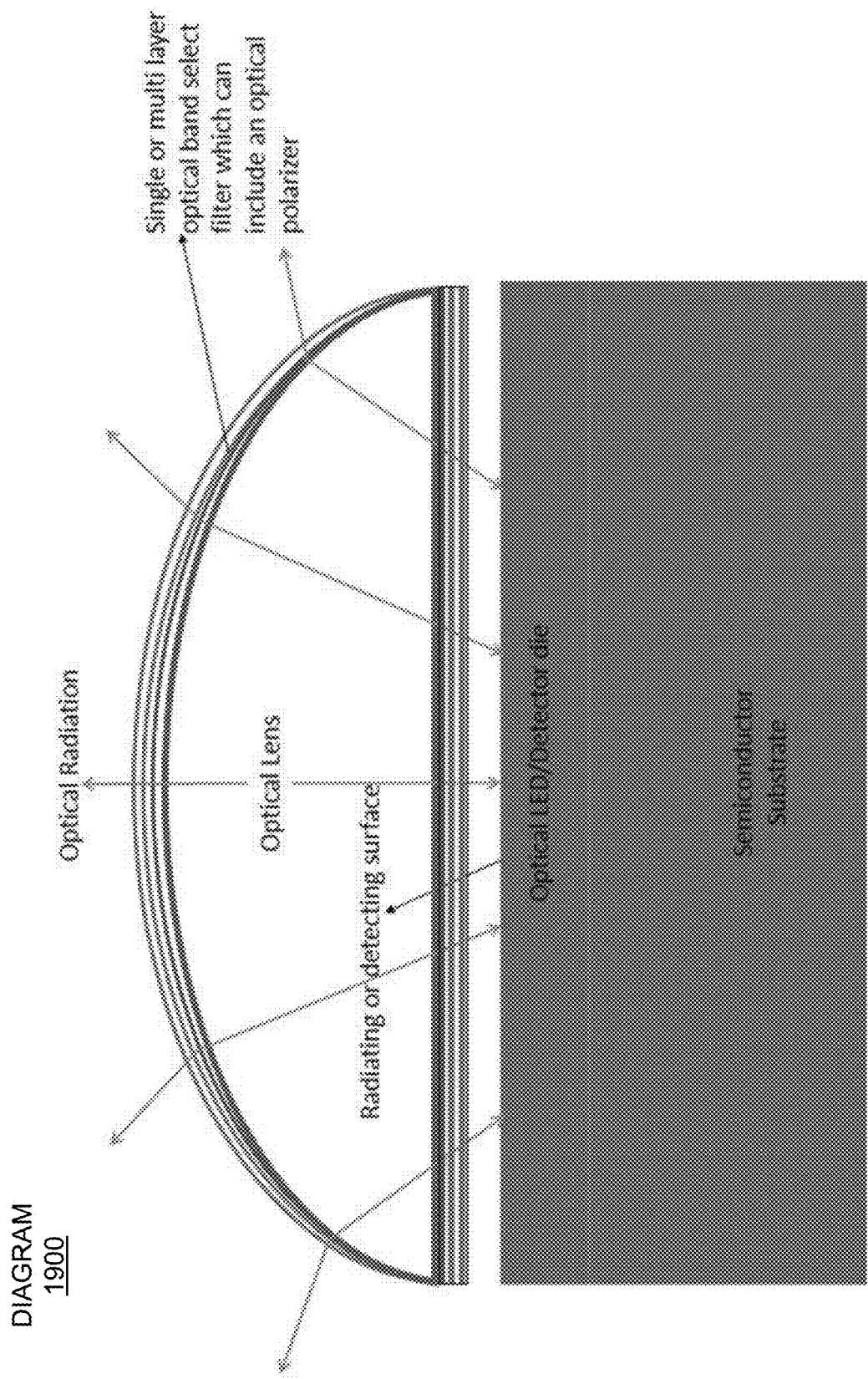
FIG. 19 depicts a diagram illustrating a single or multi-layer optical filter deposited on all sides of the optical lens surface according to an embodiment of the subject matter described herein.

For method 1, the optical filter is deposited on any or all the surfaces of the optical lens in the FSO module. FIG. 17 depicts a diagram 1700 illustrating a single or multi-layer optical filter is deposited on top of the optical lens surface according to an embodiment of the subject matter described herein. FIG. 18 depicts a diagram 1800 illustrating a single or multi-layer optical filter deposited on the bottom of the optical lens surface according to an embodiment of the subject matter described herein. FIG. 19 depicts a diagram 1900 illustrating a single or multi-layer optical filter deposited on all sides of the optical lens surface according to an embodiment of the subject matter described herein.

Figure 20:
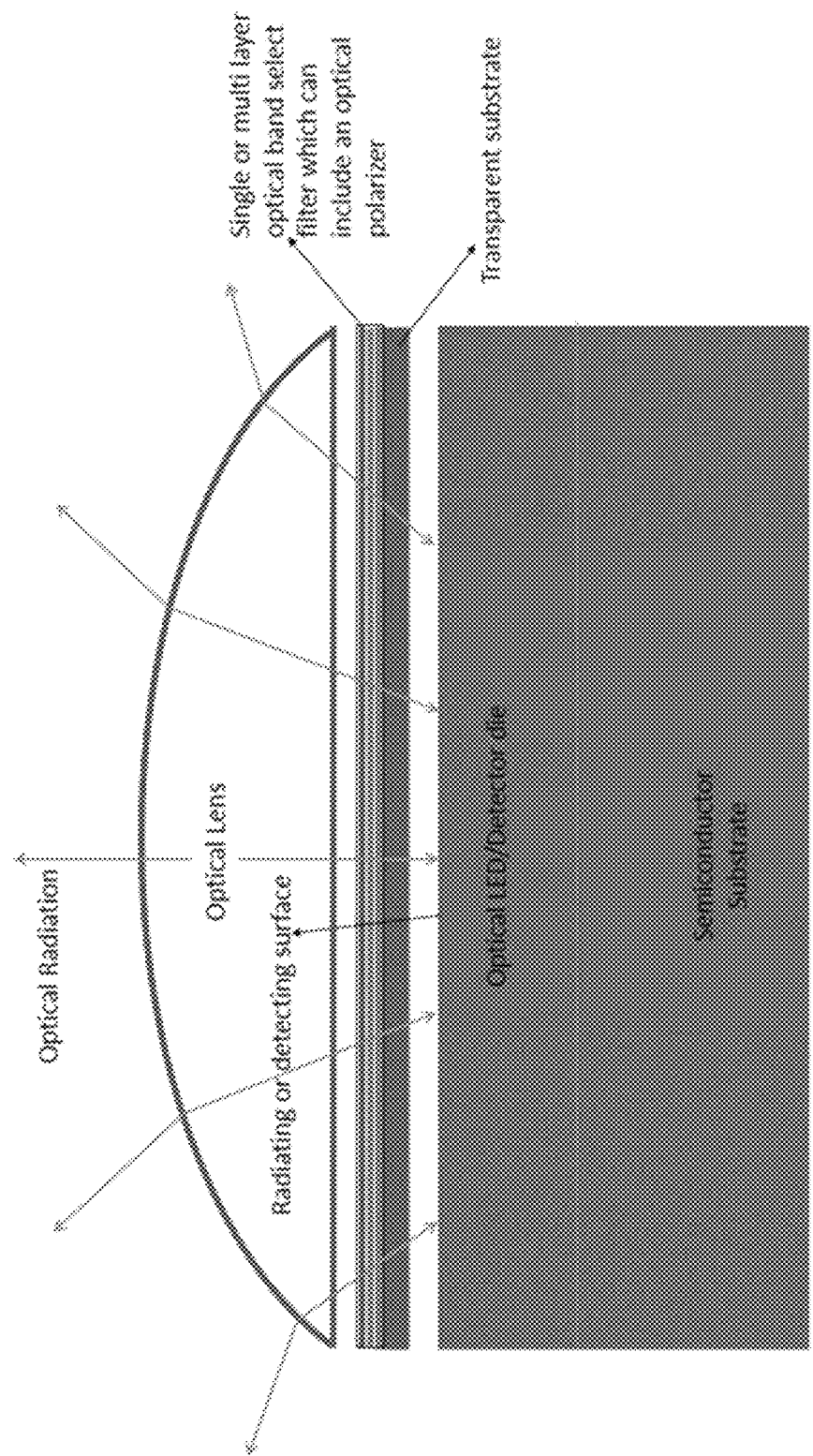
FIG. 20 depicts a diagram illustrating a single or multi-layer optical filter deposited on a physically separate element placed in between the LED and Detector die and the lens according to an embodiment of the subject matter described herein.

For method 2, FIG. 20 depicts a diagram 2000 illustrating a single or multi-layer optical filter deposited on a physically separate element placed in between the LED and Detector die and the lens according to an embodiment of the subject matter described herein.

Figure 21:
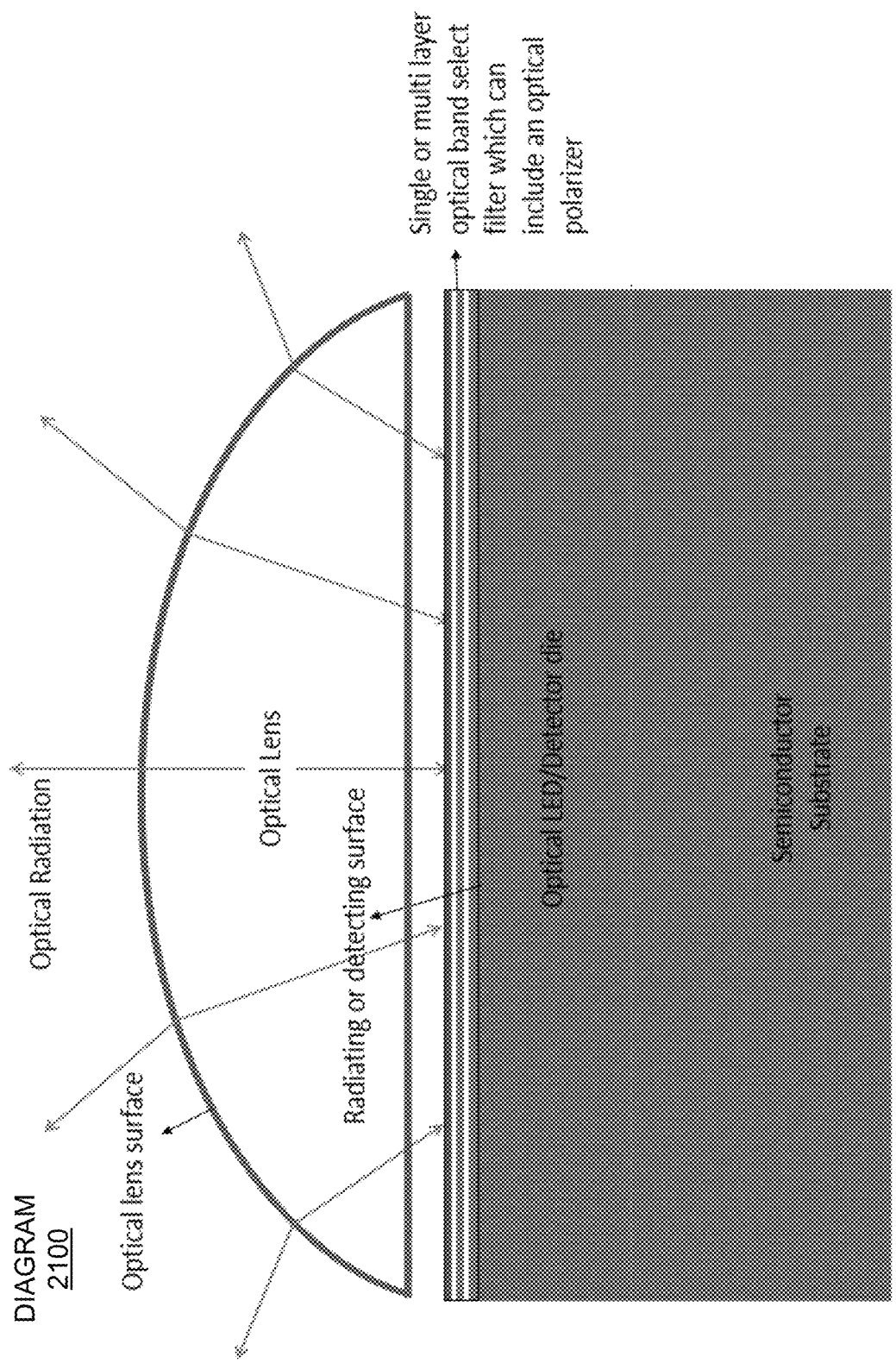
FIG. 21 depicts a diagram illustrating a single or multi-layer optical filter deposited on the radiating or detecting surface of the LED and/or detector semiconductor die. according to an embodiment of the subject matter described herein.

For method 3, the optical filter is deposited on the radiating (detecting) surface of the LED and/or semiconductor die. FIG. 21 depicts a diagram 2100 illustrating a single or multi-layer optical filter deposited on the radiating or detecting surface of the LED and/or detector semiconductor die according to an embodiment of the subject matter described herein. This configuration has the advantage that the optical traces leaving or entering the LED/Detector dies do not experience as much divergence, hence resulting in better control of the filter bandpass.

Figure 22:
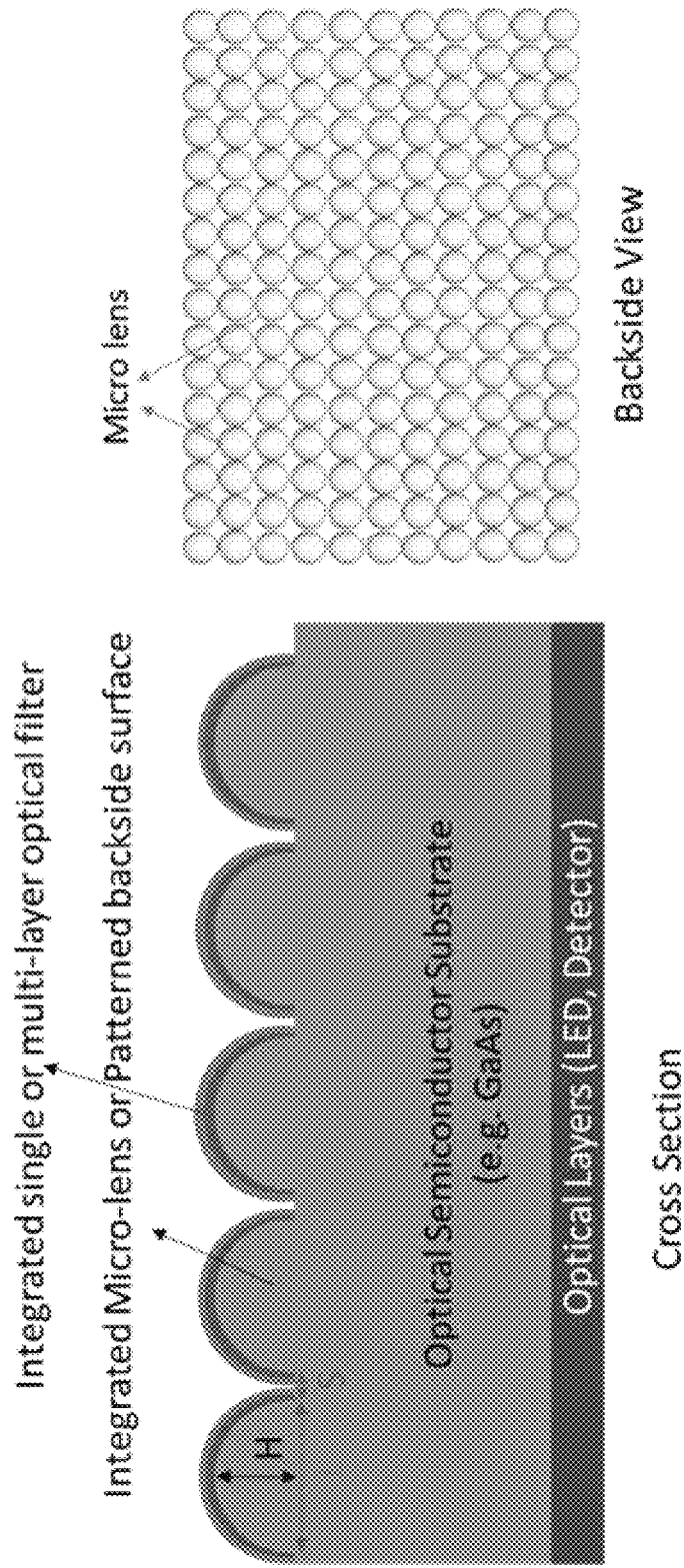
FIG. 22 depicts a diagram illustrating a single or multi-layer optical filter deposited on the micro-lens or patterned surface of the LED and/or Detector semiconductor die according to an embodiment of the subject matter described herein.

For method 4, another implementation of the optical module with integrated optical lens and filter(s) is disclosed. FIG. 22 depicts a diagram 2200 illustrating a single or multi-layer optical filter deposited on the micro-lens or patterned surface of the LED and/or Detector semiconductor die according to an embodiment of the subject matter described herein. In this implementation, the single- or multi-layer optical filter is deposited on the patterned backside (radiating or detecting side) of the optical chip. The patterned surface can include an array of micro-lenses designed to increase the optical field of view and the external optical radiation efficiency. This can also eliminate the need for an external, discrete optical lens and/or filter element in the module.

IV. Wafer Level Packaging and Assembly of Optical Modules with Electronic Circuits Performance of the ultra-high-speed optical modules may be adversely affected by the interface to the electronic circuits which are used to drive the transmitter module or the receive module via the transimpedance amplifier. The electronics circuits can be and often are implemented on a different semiconductor substrate material such as Si than those of the optical devices. The electrical bandwidth and speed of the transmission can be extremely sensitive to the parasitic inductance and capacitance associated with the transition and interconnect from the electronics semiconductor component to the optical semiconductor device. The following paragraphs disclose chip-stack packaging approaches which reduce the undesirable parasitic effect of the interconnect and reduces optical module size.

Figure 23:
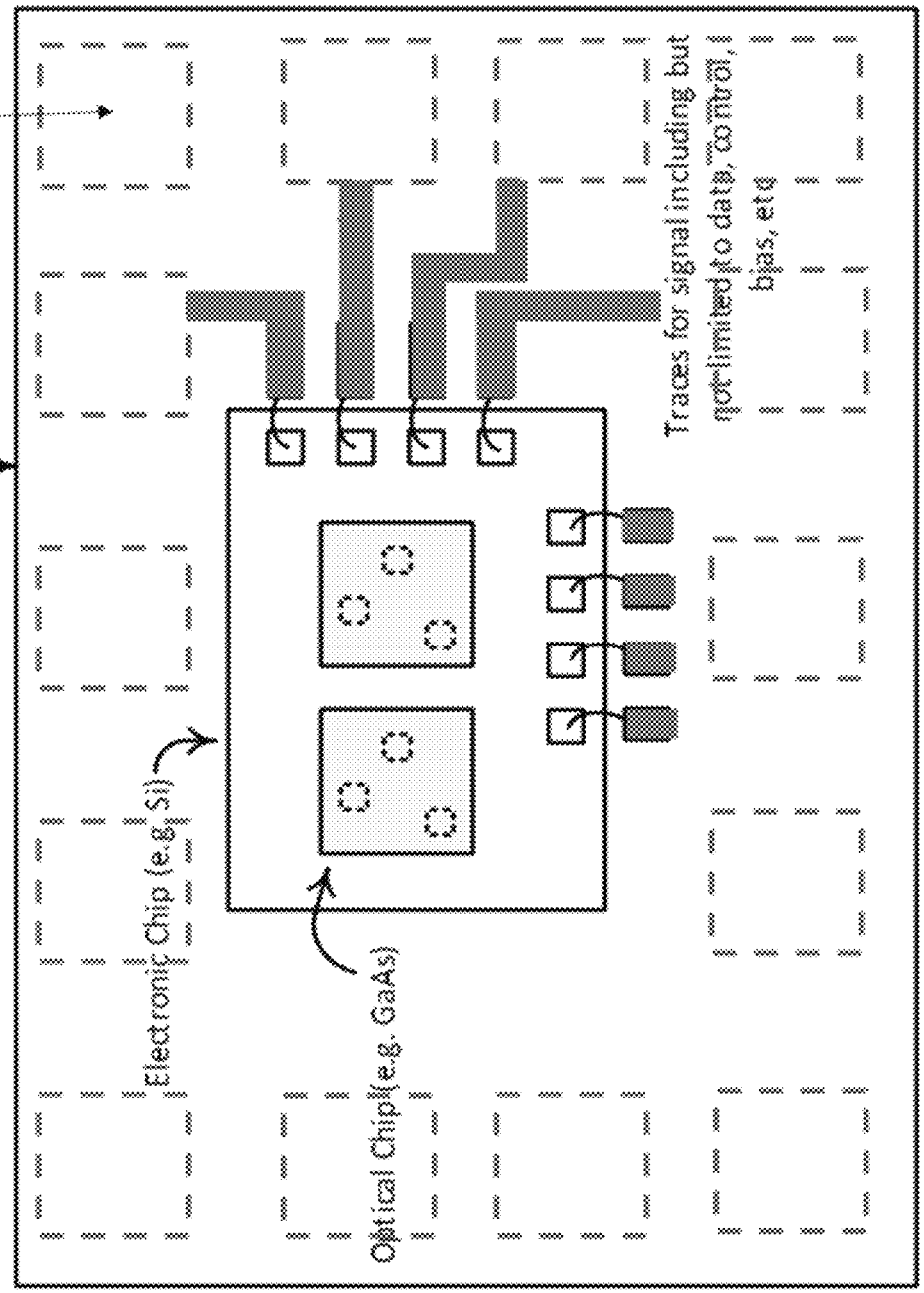
FIG. 23 depicts a diagram illustrating a top view of a chip-stack packaging implementation of optical module which minimizes the interface parasitics between electronic chip and optical chips thereby increasing bandwidth and reducing size of the module according to an embodiment of the subject matter described herein.
Figure 24:
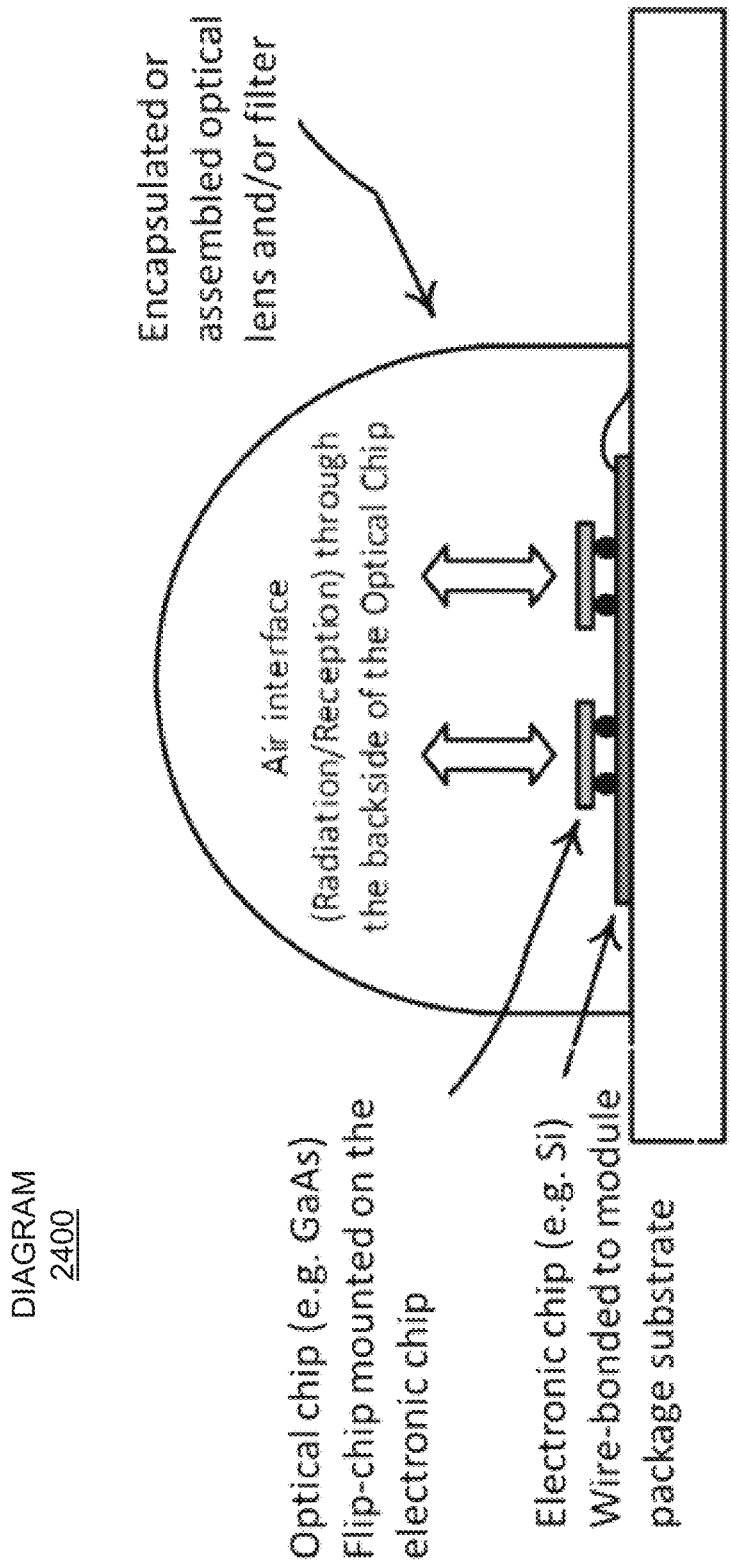
FIG. 24 depicts a diagram illustrating a side view of the chip-stack packaging implementation of FIG. 23 according to an embodiment of the subject matter described herein.

FIG. 23 depicts a diagram 2300 illustrating a top view and FIG. 24 illustrates a diagram 2400 illustrating a side view of a chip-stack packaging implementation of an optical module which minimizes the interface parasitics between electronic chip and optical chips thereby increasing bandwidth and reducing size of the module according to an embodiment of the subject matter described herein. In this implementation the optical die is flip-chip assembled onto the electronics die. The electronics die is mounted to the module package substrate or lead-frame and then wire-bonded or connected via a separate tab to the package substrate electrical traces or the leads. The bond wires or traces on the connecting tab carry electrical signals such as but not limited to data, control and bias signals which are less sensitive to inductance of the bond wires. In this arrangement, the radiation and reception of optical signal occur through the backside of the optical die which faces the front side of the optical module while the electrical signals come through the backside of the module via the package substrate or leads. This approach has the additional benefit in that it enables integration of the optical lens and/or micro-lens and optical filter on the backside of the optical die as discussed in previous section. Additional housing, optical filters, optical lens or lenses can be added to the module if necessary.

Figure 25:
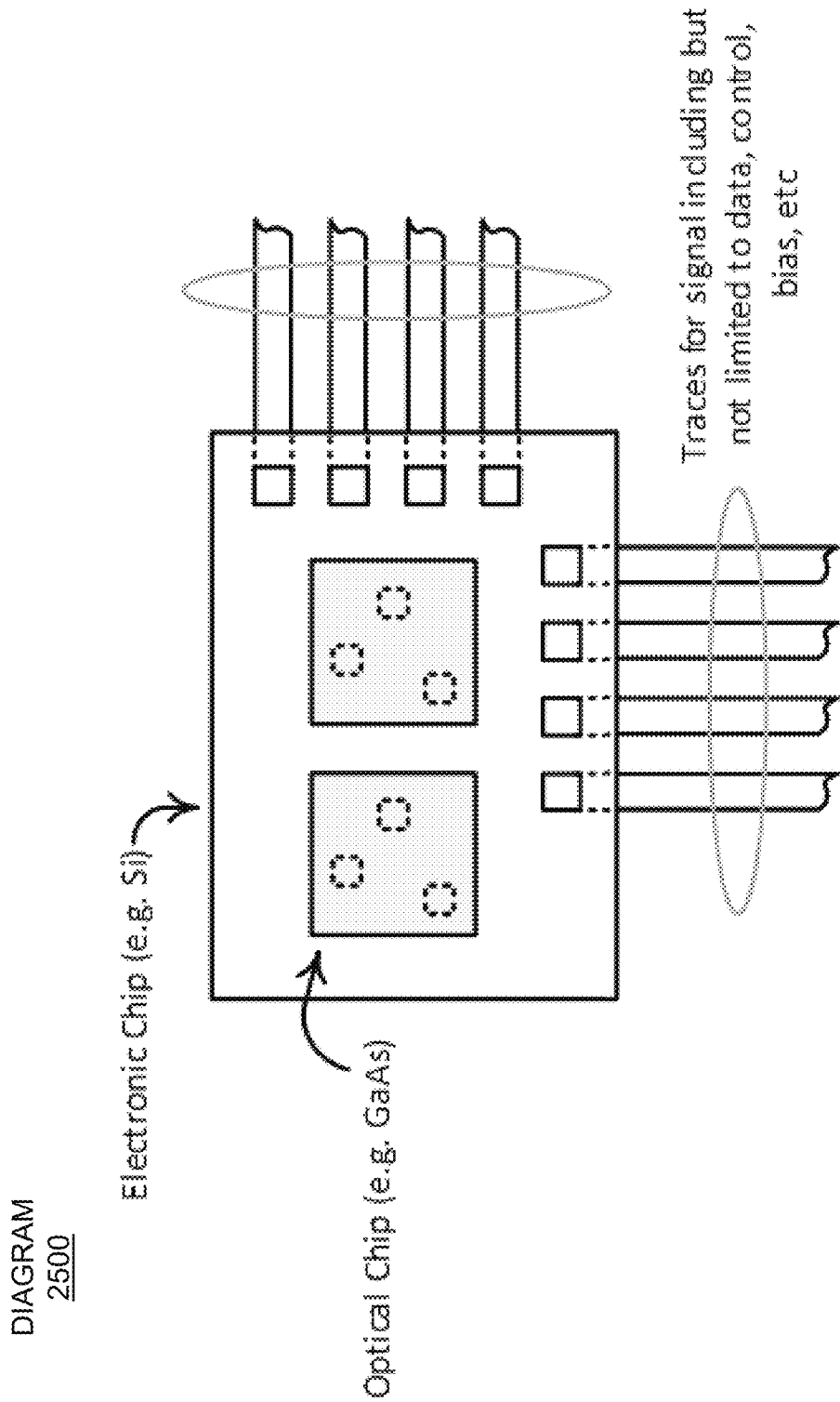
FIG. 25 depicts a diagram illustrating a top view of an alternative chip-stack packaging of the optical module according to an embodiment of the subject matter described herein.
Figure 26:
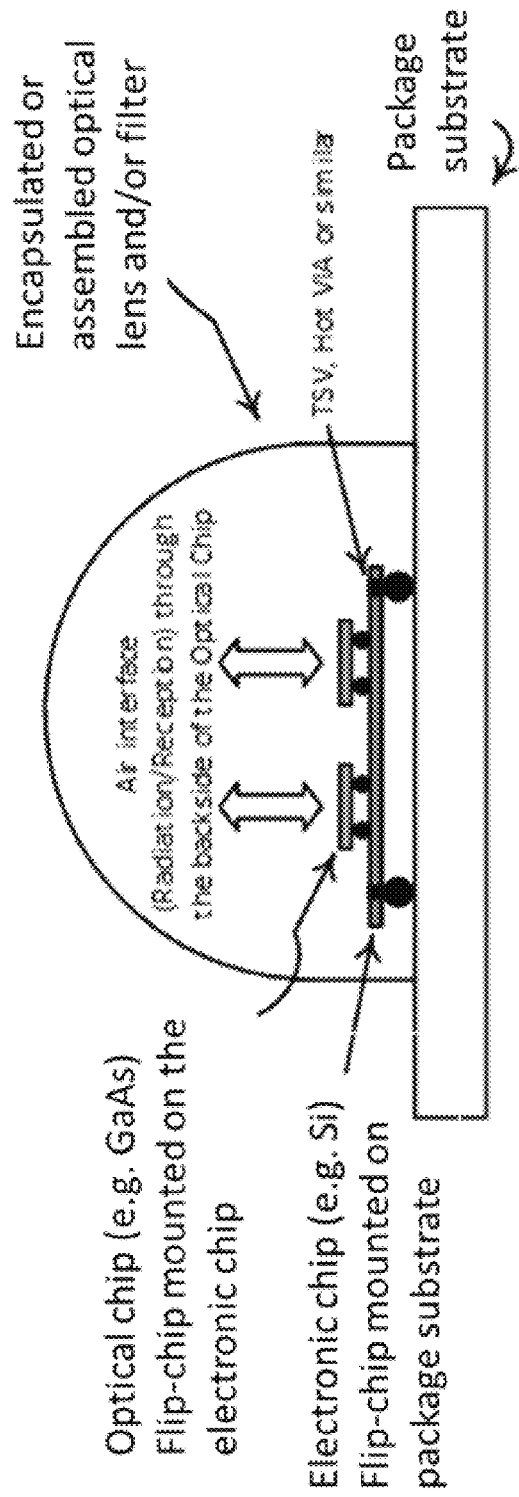
FIG. 26 depicts a diagram illustrating a side view of the alternative chip-stack packaging of the optical module according to an embodiment of the subject matter described herein.

FIG. 25 depicts a diagram 2500 illustrating a top view and FIG. 26 depicts a diagram 2600 illustrating a side view of an alternative chip-stack packaging of the optical module according to an embodiment of the subject matter described herein. As shown in diagram 2500 and diagram 2600, the signal transition between the electronics chip and the packaging substrate may be implemented by through substrate vias (TSV) or hot vias. In this implementation the electronics die is face up mounted on the packaging substrate and signals are transferred to the backside of the die by TSV where pads are placed and for example solder ball mounted to the substrate. In the alternative chip-stack packaging, the optical chips are flip-chip mounted on the electronics die, and the electronics die is face up mounted on the packaging board. TSV is used to transit the signal from the top side of the electronics die to the backside. Additional housing, sealing, lens and optical filters can be assembled on the top side of the module.

Figure 27:
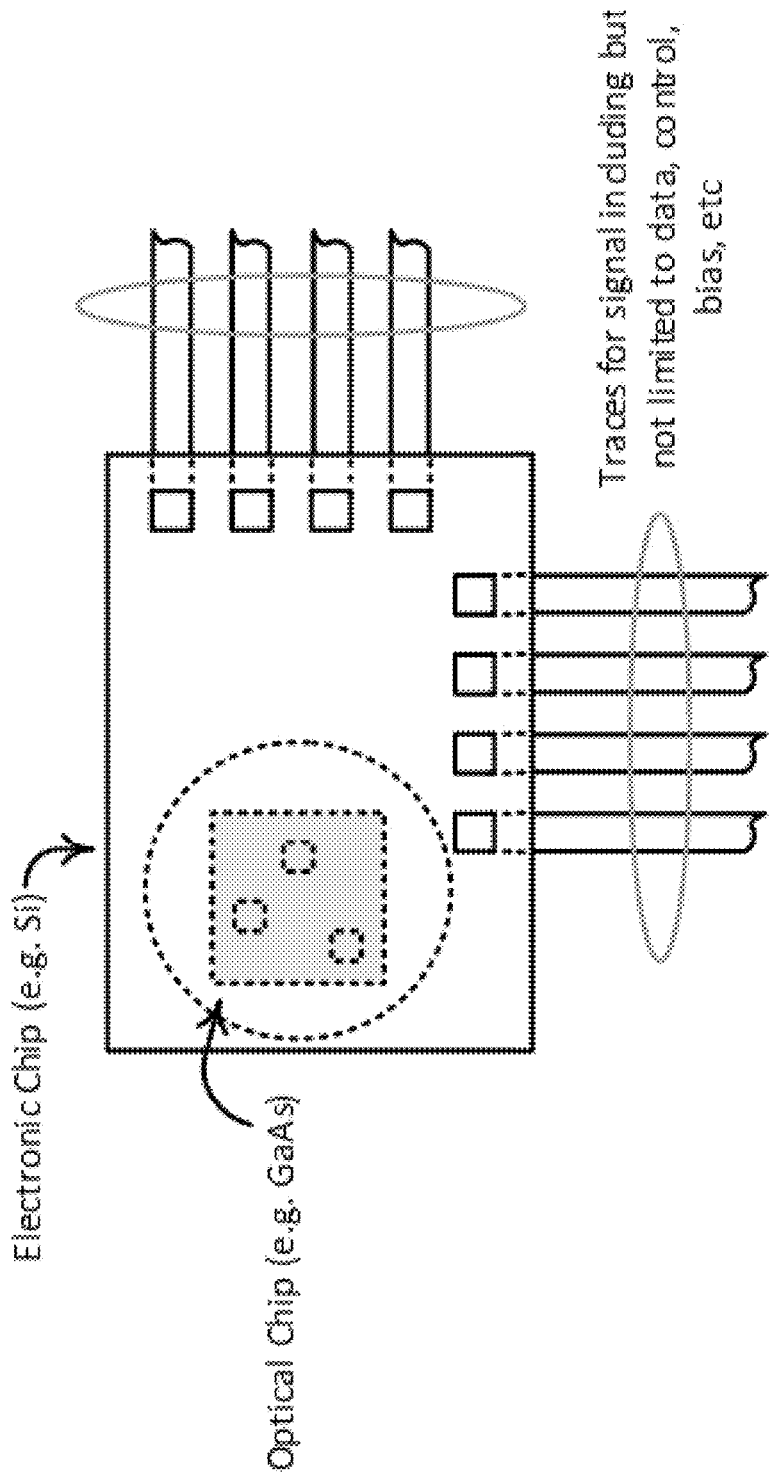
FIG. 27 depicts a diagram illustrating a top view of another implementation of the chip-stack packaging of the optical module incorporating optical and electronics chips according to an embodiment of the subject matter described herein.
Figure 28:
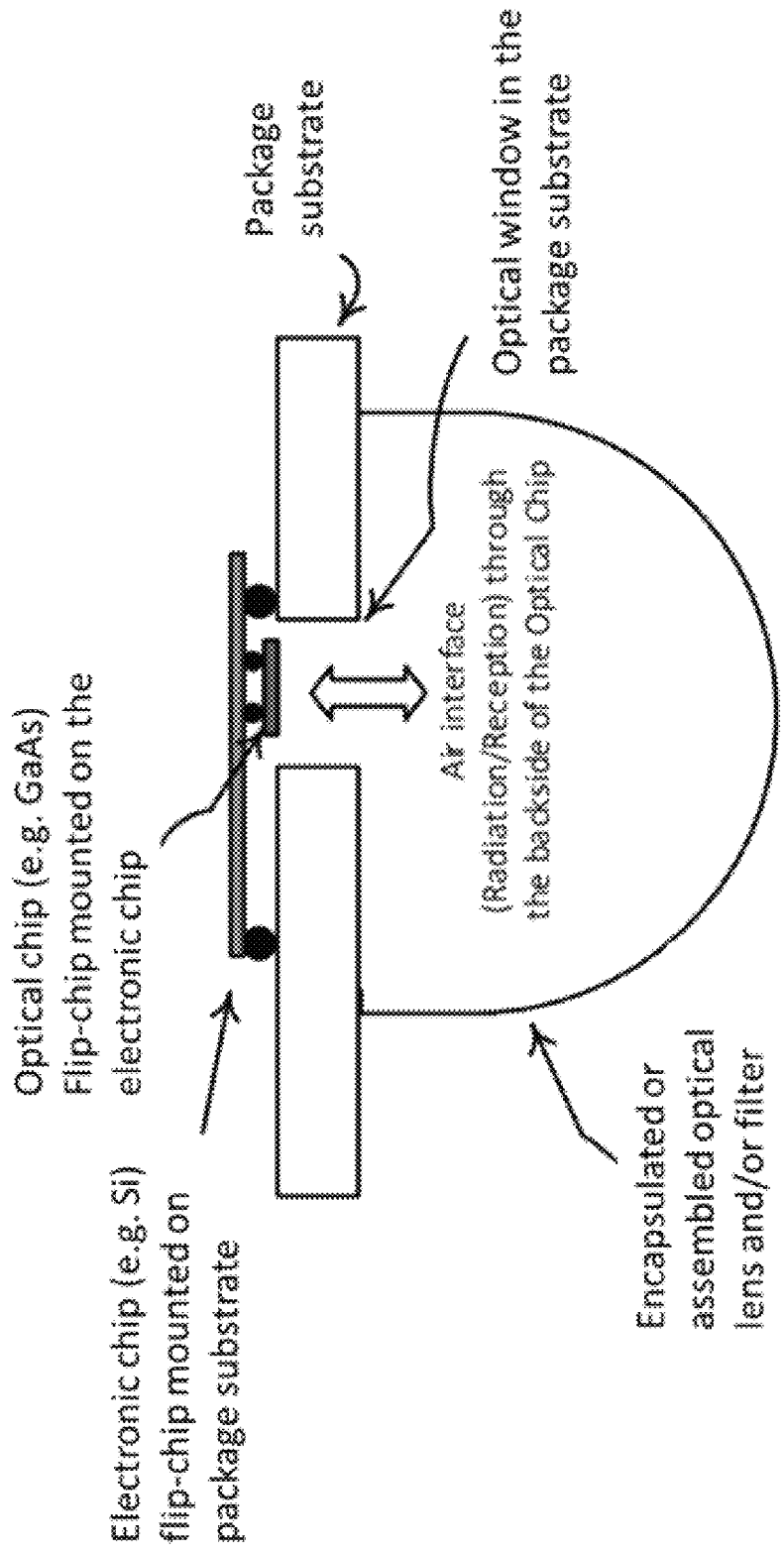
FIG. 28 depicts a diagram illustrating a side view of the another implementation of the chip-stack packaging of the optical module incorporating optical and electronics chips according to an embodiment of the subject matter described herein.

FIG. 27 depicts a diagram 2700 illustrating a top view and FIG. 28 depicts a diagram 2800 illustrating a side view of another implementation of the chip-stack packaging of the optical module incorporating optical and electronics chips according to an embodiment of the subject matter described herein. In diagram 2700 and diagram 2800, the optical die is flip-chip mounted on the electronics die and the electronics chip is face-down flip-chip mounted onto the package substrate. The radiation/reception is through an opening (optical window) in the module package substrate placed underneath the optical die. Additional seal, lenses and filters may be added on the backside of the substrate package.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The invention claimed is:

1. A free space optical (FSO) access point for communication with a plurality of FSO devices, the FSO access point comprising:
    an array of optical sources wherein:
    a first plurality of optical sources having a first wavelength; and
    a second plurality of optical sources having a second wavelength, wherein:
        the first wavelength and the second wavelength are mutually exclusive;
        the first plurality of optical sources is positioned to have a first plurality of non-overlapping far field patterns;
        the second plurality of optical sources is positioned to have a second plurality of non-overlapping far field patterns; and
        the first plurality of non-overlapping far field patterns and the second plurality of non-overlapping far field patterns provide a continuous conical far field pattern; and
    each optical source of the array of optical sources is individually controllable over a range of power levels and positioned to allow the array of optical sources to provide a plurality of steerable finite beams over the continuous conical far field pattern.

2. The FSO access point of claim 1, wherein the FSO access point is implemented within a mobile system.

3. The FSO access point of claim 2, wherein the mobile system is implemented within an aircraft system.

4. The FSO access point of claim 3, wherein the mobile system is implemented within an unmanned aerial vehicle (UAV).

5. The FSO access point of claim 2, wherein the mobile system is implemented within at least one of an unmanned automotive system and a manned automotive system.

6. The FSO access point of claim 1, wherein the plurality of steerable finite beams provides a mutually exclusive communication channel to each FSO device of the plurality of FSO devices.

7. The FSO access point of claim 6, wherein the plurality of FSO devices is configured to communicate with each other independent of the FSO access point.

8. The FSO access point of claim 7, wherein the FSO access point is configured to be positioned on a first building and the another FSO access point is configured to be positioned on a second building.

9. The FSO access point of claim 1, wherein:
    a first portion of the plurality of FSO devices are mobile FSO devices; and
    a second portion of the plurality of FSO devices are fixed FSO devices.

10. The FSO access point of claim 9, wherein each mobile FSO device is at least one of a manned aircraft, an unmanned aerial vehicle (UA), autonomous underwater vehicle (AUV), a manned automotive system, an unmanned automotive system, a virtual reality (VR) system, and an augmented reality (AR) system.

11. The FSO access point of claim 1, wherein the FSO access point is configured to communicate with another FSO access point.

12. The FSO access point of claim 1, wherein:
    the FSO access point is configure as a buoy;
    a first portion of the array of optical sources are configured to communicate with an FSO device above water; and
    a second portion of the array of optical sources are configured to communicate with a submerged FSO device.

13. The FSO access point of claim 1, wherein the array of optical sources is configured as at least one of a linear array and a two-dimensional array.

14. The FSO access point of claim 1, wherein at least of portion of the array of optical sources are coherent optical sources.

15. The FSO access point of claim 1, wherein at least of portion of the array of optical sources are non-coherent optical sources.

16. The FSO access point of claim 1 further comprising a reflector disk, wherein the array of optical sources is positioned within a focal place of the reflector disk.

17. The FSO access point of claim 1, wherein the FSO access point is configured to be position in at least one of an indoor environment and an outdoor environment.

18. The FSO access point of claim 1, wherein the array of optical sources is configured to use a plurality of optical sources to form multiple beams directed at a single FSO device for increased communication bandwidth and range.

19. The FSO access point of claim 18, wherein the plurality of optical sources provides multi-beam spatial diversity.

20. The FSO access point of claim 1, wherein the FSO access point is configured to provide secure communication through optical beams with wavelength hopping.

* * * * *